US011991722B2

(12) United States Patent
Hosseini et al.

(10) Patent No.: US 11,991,722 B2
(45) Date of Patent: May 21, 2024

(54) APPLICATION OF AN UPLINK (UL) CANCELLATION INDICATION IN A WIRELESS COMMUNICATIONS NETWORK

(71) Applicant: QUALCOMM Incorporated, San Diego, CA (US)

(72) Inventors: Seyedkianoush Hosseini, San Diego, CA (US); Muhammad Sayed Khairy Abdelghaffar, San Jose, CA (US); Seyed Ali Akbar Fakoorian, San Diego, CA (US); Ahmed Attia Abotabl, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/159,957

(22) Filed: Jan. 26, 2023

(65) Prior Publication Data
US 2023/0247642 A1 Aug. 3, 2023

Related U.S. Application Data

(63) Continuation of application No. 16/949,806, filed on Nov. 13, 2020, now Pat. No. 11,595,983.

(51) Int. Cl.
H04W 72/23 (2023.01)
H04L 5/14 (2006.01)
H04W 72/0446 (2023.01)

(52) U.S. Cl.
CPC ............. H04W 72/23 (2023.01); H04L 5/14 (2013.01); H04W 72/0446 (2013.01)

(58) Field of Classification Search
CPC ...... H04W 72/23; H04W 72/0446; H04L 5/14
See application file for complete search history.

(56) References Cited

U.S. PATENT DOCUMENTS 10,979,976 B1    4/2021  Babaei
11,310,827 B2    4/2022  Bae et al.
(Continued)

FOREIGN PATENT DOCUMENTS

EP         3860283 A1    8/2021
WO    WO-2020033660 A1   2/2020
(Continued)

OTHER PUBLICATIONS

International Search Report and Written Opinion—PCT/US2021/054567—ISA/EPO—dated Feb. 23, 2022.
(Continued)

Primary Examiner — Bailor C Hsu
(74) Attorney, Agent, or Firm — Arun Swain

(57) ABSTRACT

Wireless communications systems and methods related to applying an uplink (UL) cancellation indication are provided. A UE may receive downlink control information (DCI) from a base station (BS). The DCI may include an uplink (UL) cancellation indication that references a plurality of resources in one or more full-UL slots and one or more full-duplex slots. The UE may refrain, based on the UL cancellation indication, from transmitting a communication in at least one of a first resource of the plurality of resources in the one or more full-UL slots or a second resource of the plurality of resources in the one or more full-duplex slots. Other aspects and features are also described.

20 Claims, 19 Drawing Sheets

(56) References Cited

U.S. PATENT DOCUMENTS

| | | |
|---|---|---|
| 11,595,983 B2 | 2/2023 | Hosseini et al. |
| 2019/0098612 A1 | 3/2019 | Babaei et al. |
| 2019/0149269 A1* | 5/2019 | Chatterjee ......... H04W 72/1268 370/329 |
| 2019/0254067 A1 | 8/2019 | Al-Imari et al. |
| 2019/0363843 A1* | 11/2019 | Gordaychik .............. H04L 1/08 |
| 2020/0229202 A1* | 7/2020 | Bagheri .............. H04L 25/0226 |
| 2020/0260445 A1 | 8/2020 | Jeong et al. |
| 2020/0260487 A1 | 8/2020 | Bhattad et al. |
| 2020/0296701 A1* | 9/2020 | Park ..................... H04W 72/56 |
| 2020/0305183 A1 | 9/2020 | Papasakellariou |
| 2020/0344747 A1 | 10/2020 | Park |
| 2020/0351897 A1 | 11/2020 | Fakoorian et al. |
| 2020/0359447 A1 | 11/2020 | Yang et al. |
| 2020/0389876 A1 | 12/2020 | Islam et al. |
| 2021/0100012 A1* | 4/2021 | Miao ..................... H04W 72/23 |
| 2021/0144708 A1 | 5/2021 | Wang |
| 2021/0218503 A1* | 7/2021 | Babaei .................. H04L 1/1861 |
| 2021/0400644 A1* | 12/2021 | Islam ................... H04L 5/0051 |
| 2022/0132499 A1 | 4/2022 | Novlan |
| 2022/0159659 A1* | 5/2022 | Hosseini ............... H04W 24/08 |
| 2023/0276434 A1* | 8/2023 | Ibrahim ................ H04L 1/1864 370/329 |

FOREIGN PATENT DOCUMENTS

| | | |
|---|---|---|
| WO | WO-2020065893 A1 | 4/2020 |
| WO | WO-2020227103 A1 | 11/2020 |

OTHER PUBLICATIONS

VIVO: "Summary of UL Inter UE Tx Prioritization for URLLC", 3GPP TSG RAN WG1 #100bis, 3GPP Draft, R1-2001676, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 14, 2020 (Apr. 14, 2020), 25 Pages, XP051876354, RAN1#98bis Agreements; p. 19.

* cited by examiner

APPLICATION OF AN UPLINK (UL) CANCELLATION INDICATION IN A WIRELESS COMMUNICATIONS NETWORK

CROSS REFERENCE TO RELATED APPLICATIONS

This is a continuation of U.S. patent application Ser. No. 16/949,806, filed on Nov. 13, 2020, which is related to U.S. patent application Ser. No. 16/949,805, filed Nov. 13, 2020, which is hereby incorporated by reference in its entirety as if fully set forth below and for all applicable purposes.

TECHNICAL FIELD

This application relates to wireless communication systems, and more particularly to improving communication transmissions in full-duplex slots and/or full-UL slots. Various embodiments can enable and provide solutions and techniques for improving performance (e.g., latency) and/or allowing communication devices (e.g., user equipment devices) to cancel configured and/or scheduled transmissions (e.g., cancel a lower priority transmission to allow a higher priority transmission to be communicated and/or that fall within a full-duplex slot and/or full-UL slot.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands.

NR is also designed to operate across different spectrum types, from licensed spectrum to unlicensed and shared spectrum. Spectrum sharing enables operators to opportunistically aggregate spectrums to dynamically support high-bandwidth services.

Spectrum sharing can extend the benefit of NR technologies to operating entities that may not have access to a licensed spectrum. As use cases and diverse deployment scenarios continue to expand in wireless communication, full-duplex communication technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques for canceling an UL transmission in a configured grant resource, a dynamically scheduled resource, and/or a semi-persistent scheduled resource. A base station (BS) may transmit a configured grant indicating a configured grant resource to a UE. The configured grant resource may include a plurality of resources (e.g., time and/or frequency resources) in one or more full-uplink (UL) slots and one or more full-duplex slots. The UE may receive the configured grant and desire to communicate an UL communication signal in the configured grant resource. Before the UE transmits the UL communication signal, the BS may desire to stop the UE from transmitting in the configured grant resource. For example, the BS may desire to schedule another UE having more urgent data to transmit in the configured grant resource. The BS may transmit downlink control information (DCI) including an UL cancellation indication that references the plurality of resources. The UE may receive the DCI and apply the UL cancellation indication to at least one of the one or more full-UL slots or the one or more full-duplex slots based on a set of parameters. The set of parameters may vary and may be, for example, frequency parameters and/or time parameters associated with the plurality of resources. The UE may determine, based on applying the UL cancellation indication, whether to transmit an UL communication in a first resource of the plurality of resources in the one or more full-UL slots and/or a second resource of the plurality of resources in the one or more full-duplex slots. The UE may refrain, based on applying the UL cancellation indication, from transmitting a communication in at least one of the first resource or the second resource.

In some instances, a method of wireless communication performed by a user equipment (UE) is provided. The method can include receiving downlink control information (DCI) from a base station (BS), the DCI including an uplink (UL) cancellation indication that references a plurality of resources in one or more full-UL slots and one or more full-duplex slots; applying the UL cancellation indication to at least one of the one or more full-UL slots or the one or more full-duplex slots based on a set of parameters; and refraining, based on applying the UL cancellation indication, from transmitting a communication in at least one of a first resource of the plurality of resources in the one or more full-UL slots or a second resource of the plurality of resources in the one or more full-duplex slots.

In some instances, a method of wireless communication performed by a base station (BS) is provided. The method can include determining a monitoring occasion for transmitting downlink control information (DCI) to a first user equipment (UE), the DCI including an uplink (UL) cancellation indication that references a plurality of resources in one or more full-UL slots and one or more full-duplex slots; transmitting the DCI in the monitoring occasion; and scheduling a second UE for an UL transmission in at least one of the one or more full-UL slots or the one or more full-duplex slots.

In some instances, a user equipment (UE) can include a transceiver configured to receive downlink control information (DCI) from a base station (BS), the DCI including an uplink (UL) cancellation indication that references a plurality of resources in one or more full-UL slots and one or more full-duplex slots and a processor in communication with the transceiver, the processor configured to apply the UL cancellation indication to at least one of the one or more full-UL slots or the one or more full-duplex slots based on a set of parameters and refrain, based on applying the UL cancellation indication, from transmitting a communication in at least one of a first resource of the plurality of resources in the one or more full-UL slots or a second resource of the plurality of resources in the one or more full-duplex slots.

In some instances, a base station (BS) can include a processor configured to determine a monitoring occasion for transmitting downlink control information (DCI) to a first user equipment (UE), the DCI including an uplink (UL) cancellation indication that references a plurality of resources in one or more full-UL slots and one or more full-duplex slots; and schedule a second UE for an UL transmission in at least one of the one or more full-UL slots or the one or more full-duplex slots; and a transceiver in communication with the processor, the transceiver configured to transmit the DCI in the monitoring occasion.

In some instances, a user equipment (UE) can include means for receiving downlink control information (DCI) from a base station (BS), the DCI including an uplink (UL) cancellation indication that references a plurality of resources in one or more full-UL slots and one or more full-duplex slots; means for applying the UL cancellation indication to at least one of the one or more full-UL slots or the one or more full-duplex slots based on a set of parameters; and means for refraining, based on applying the UL cancellation indication, from transmitting a communication in at least one of a first resource of the plurality of resources in the one or more full-UL slots or a second resource of the plurality of resources in the one or more full-duplex slots.

In some instances, a base station (BS) can include means for determining a monitoring occasion for transmitting downlink control information (DCI) to a first user equipment (UE), the DCI including an uplink (UL) cancellation indication that references a plurality of resources in one or more full-UL slots and one or more full-duplex slots; means for transmitting the DCI in the monitoring occasion; and means for scheduling a second UE for an UL transmission in at least one of the one or more full-UL slots or the one or more full-duplex slots.

In some instances, a non-transitory computer-readable medium having program code recorded thereon for wireless communication by a user equipment (UE) is provided. The program code can include code for causing the UE to receive downlink control information (DCI) from a base station (BS), the DCI including an uplink (UL) cancellation indication that references a plurality of resources in one or more full-UL slots and one or more full-duplex slots; code for causing the UE to apply the UL cancellation indication to at least one of the one or more full-UL slots or the one or more full-duplex slots based on a set of parameters; and code for causing the UE to refrain, based on applying the UL cancellation indication, from transmitting a communication in at least one of a first resource of the plurality of resources in the one or more full-UL slots or a second resource of the plurality of resources in the one or more full-duplex slots.

In some instances, a non-transitory computer-readable medium having program code recorded thereon for wireless communication by a base station (BS) is provided. The program code can include code for causing the BS to determine a monitoring occasion for transmitting downlink control information (DCI) to a first user equipment (UE), the DCI including an uplink (UL) cancellation indication that references a plurality of resources in one or more full-UL slots and one or more full-duplex slots; code for causing the BS to transmit the DCI in the monitoring occasion; and code for causing the BS to schedule a second UE for an UL transmission in at least one of the one or more full-UL slots or the one or more full-duplex slots.

In some other instances, a wireless communication device (e.g., BS and/or UE) can be configured to implement or perform additional methods to facilitate wireless communication. For example, a wireless communication device can receive downlink control information (DCI) from another wireless communication device (e.g., a base station). In some scenarios, DCI may include an uplink (UL) cancellation indication. The uplink cancellation indication may reference one or more of a plurality of resources in one or more transmission (e.g., full-UL slots and one or more full-duplex slots). The reference may be used for cancellation purposes as discussed herein. Additionally, or alternatively, a wireless communication device may refrain from transmitting a communication based on one or more cancellation indications. In some scenarios, for example, a wireless communication device may refrain from transmitting in at least one of a first resource of the plurality of resources in the one or more full-UL slots or a second resource of the plurality of resources in the one or more full-duplex slots. Additionally or alternatively, transmission refrains may be based directly and/or indirectly on applying a UL cancellation indication as well as resources that may be used during communication. Also, additionally or alternatively, a wireless communication device may apply a UL cancellation indication to some resources (e.g., at least one of the one or more full-UL slots or the one or more full-duplex slots based on a set of parameters) in reaching determinations as to which resources may be subject to transmission refrains.

In yet some additional instances, a wireless communication device (e.g., BS and/or UE) can be configured to implement or perform additional methods to facilitate wireless communication. For example, a wireless communication device may comprise a processor enabling execution of a number of instructions to implement a method. Such a method, in some instances, may include determining a monitoring occasion for transmitting downlink control information (DCI) to a first user equipment (UE). In some scenarios, DCI may include an uplink (UL) cancellation indication. The cancellation indication may reference a plurality of other communication resources (e.g., in one or more full-UL slots and one or more full-duplex slots). A device may also schedule a second UE for an UL transmission in at least one of the one or more full-UL slots or the one or more full-duplex slots. A device may also include a transceiver in communication with the processor configured to transmit the DCI in the monitoring occasion.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that

DETAILED DESCRIPTION

Figure 1:
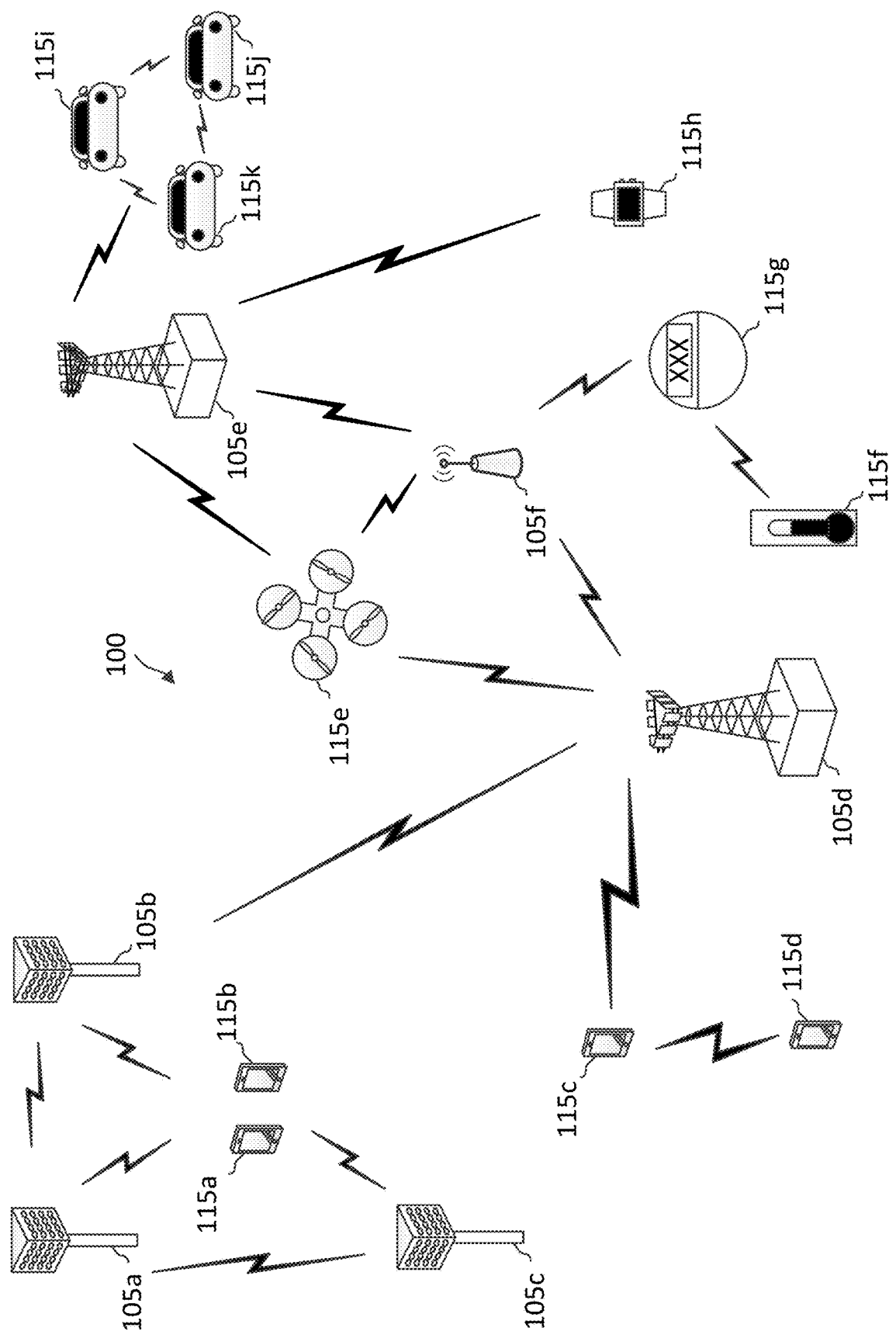
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS and/or a UE may support full-duplex communications. Full-duplex communications refer to simultaneous transmission and reception of signals in the same frequency band. However, one main issue with full-duplex communications is self-interference. Self-interference refers to signal leakage from a local transmitter to a local receiver. In an example, a BS may simultaneously transmit a DL signal and receive an UL signal via transmit antennas and receive antennas, respectively, at the BS. During the simultaneous DL transmission and UL reception in the same frequency band, the DL signal may leak from the transmit antennas into the receive antennas, thus causing self-interference from the transmitted DL signal to the received UL signal at the BS. In another example, a UE may simultaneously transmit an UL signal to a BS and receive a DL signal from the BS in the same frequency band. Similarly, the simultaneous UL transmission and DL reception may cause self-interference from the UL transmission to the DL reception at the UE. In a further example, a UE may communicate with multiple transmission-reception points (TRPs) and may simultaneously transmit an UL signal to one TRP and receive a DL signal from another TRP in the same frequency band. Again, the simultaneous UL transmission and DL reception may cause self-interference from the UL transmission to the DL reception at the UE.

Full-duplex communications may be configured in various modes, for example, an in-band full-duplex (IBFD) mode and a subband full-duplex (SBFD) mode. In an IBFD mode, an UL band can be fully overlapping with a DL band or partially overlapping with the DL band within a channel frequency bandwidth. In an SBFD mode, a channel frequency bandwidth may include an UL band spaced apart from a DL band by a small or narrow guard band. The SFBD mode differs from an FDD mode in the frequency separation between the UL band and the DL band being significantly smaller or narrower than in the FDD mode. Additionally, the SFBD mode may operate over a single unpaired spectrum band, while the FDD mode operates over a paired spectrum including an UL spectrum band and a DL spectrum band.

In some aspects, the BS may employ a combination of a full-duplex mode, a DL-only mode, and an UL-only mode for communications with UEs over a single channel frequency band (e.g., an unpaired spectrum band). For instance, the BS may configure some transmission slots to be DL slots for DL communications and some transmission slots to be UL slots for UL communications. The BS may also configure some transmission slots to be full-duplex slots for simultaneous UL and DL communications. The BS may determine the slot configurations, for example, depending on traffic needs in the UL direction and in the DL direction.

A BS may schedule a UE for UL and/or DL communications. For example, the UE may transmit an UL data signal via a scheduled UL grant. Additionally, the UE may receive a DL data signal via a scheduled DL grant. In some examples, rather than wait for a UL grant, the UE may transmit a UL communication signal in a configured grant resource. The BS may allocate configured grant resources in an unlicensed frequency band and/or a licensed band for UL or DL transmission.

The BS may transmit a configured grant indicating a plurality of resources to a first UE. The configured grant may reference a configured grant resource including the plurality of resources (e.g., time and/or frequency resources). The UE may transmit in any resource of the plurality of resources in the configured grant resource without having to receive a scheduling grant for each resource of the plurality of resources. The first UE may receive the configured grant and desire to transmit an UL communication signal in the configured grant resource. Before the first UE transmits in the configured grant resource, the BS may desire to reallocate at least some of the configured grant resources to a second UE to transmit in the configured grant resource rather than allow the first UE to transmit in the configured grant resource. The BS may transmit DCI including an UL cancellation indication to the first UE, where the UL cancellation indication references the plurality of resources. The plurality of resources may be in one or more full-UL slots and/or one or more full-duplex slots. When the BS utilizes a combination of DL slots, UL slots, and full-duplex slots, one or more resources of the plurality of resources may fall solely within one or more full-duplex slots, solely within one or more full-UL slots, or within one or more full-duplex slots and one or more full-UL slots.

The first UE may receive the DCI including the UL cancellation indication. The full-UL slots and the full-duplex slots have different UL frequency bandwidths. Accordingly, it may be desirable for the first UE to determine whether the UL cancellation indication is for the UL transmission in one or more full-duplex slots, one or more full-UL slots, or both the full-duplex slot(s) and the full-UL slot(s). For example, the UL cancellation indication may be applicable only to full-UL slots, only to full-duplex slots, or both full-UL slots and full-duplex slots. The present disclosure provides techniques for determining how the UE should apply a detected UL cancellation indication. For example, the UE may distinguish whether the UL cancellation indication corresponds to a resource cancellation in full-UL slots, full-duplex slots, or both full-UL slots and full-duplex slots.

Various mechanisms and techniques for cancelling transmission of an UL communication in a resource based on an UL cancellation indication are discussed herein. In some aspects, the UL cancellation indication references a plurality of resources (e.g., time and/or frequency resources) in one or more full-UL slots and one or more full-duplex slots. The first UE may apply the UL cancellation indication to at least one of the one or more full-UL slots or the one or more full-duplex slots based on a set of parameters. The first UE may refrain, based on applying the UL cancellation indication, from transmitting a communication in at least one of a first resource of the plurality of resources in the one or more full-UL slots or a second resource of the plurality of resources in the one or more full-duplex slots.

Aspects of the present disclosure can provide several benefits. For example, the BS may allow the second UE to transmit in the configured grant resource and instruct the first UE to cancel or pause its UL transmission in the configured grant resource. Accordingly, the BS may prioritize the second UE's transmission having a high traffic priority or stringent latency requirement over the first UE's transmission and/or communication performance may be improved. Additionally, the first UE may apply, based on a set of parameters, an UL cancellation indication to at least one of the one or more full-UL slots or the one or more full-duplex slots while being able to transmit communications in other full-duplex slots and/or full-UL slots, allowing flexibility in transmission rates based on network traffic.

While the present disclosure is described in the context of cancellation for configured grant resources, similar techniques can also be applied to cancel dynamically scheduled or granted resources and/or semi-persistent scheduled resources (e.g., sounding reference signal (SRS) and physical uplink shared channel (PUSCH) resources).

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
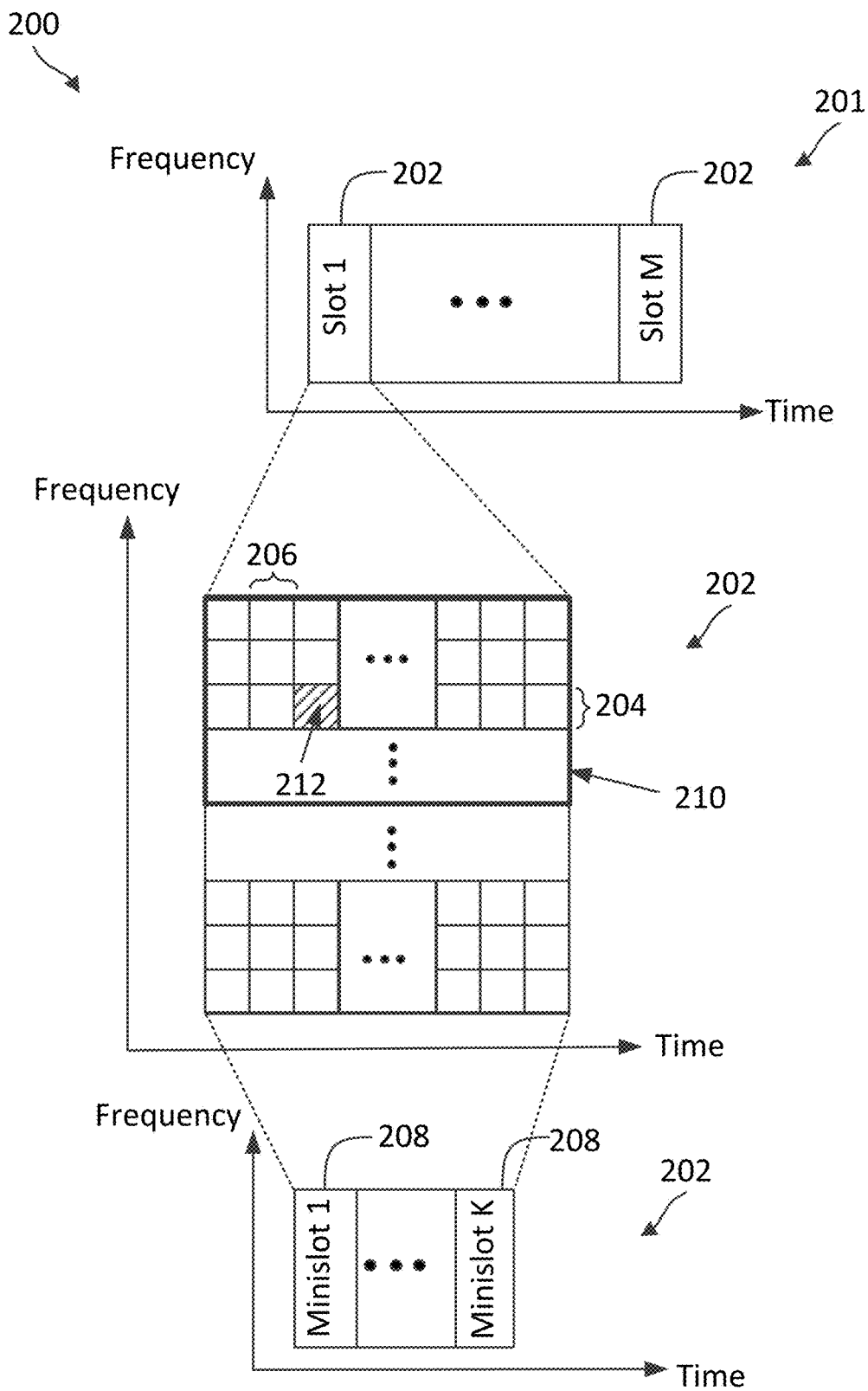
FIG. 2 illustrates a radio frame structure according to one or more aspects of the present disclosure.

FIG. 2 illustrates a radio frame structure 200 according to one or more aspects of the present disclosure. The radio frame structure 200 may be employed by BSs such as the BSs 105 and UEs such as the UEs 115 in a network such as the network 100 for communications. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of an RB 210 (e.g., including about 12 subcarriers 204).

Figure 3A:
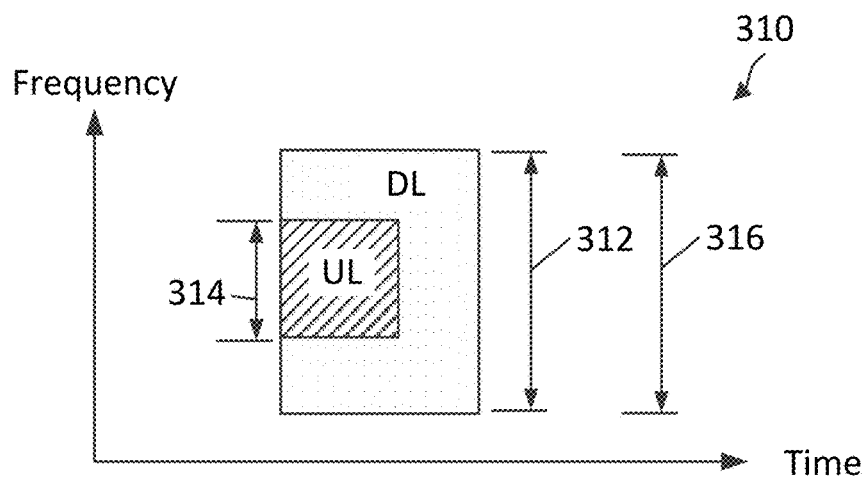
FIG. 3A illustrates a full-duplex communication configuration according to one or more aspects of the present disclosure.
Figure 3B:
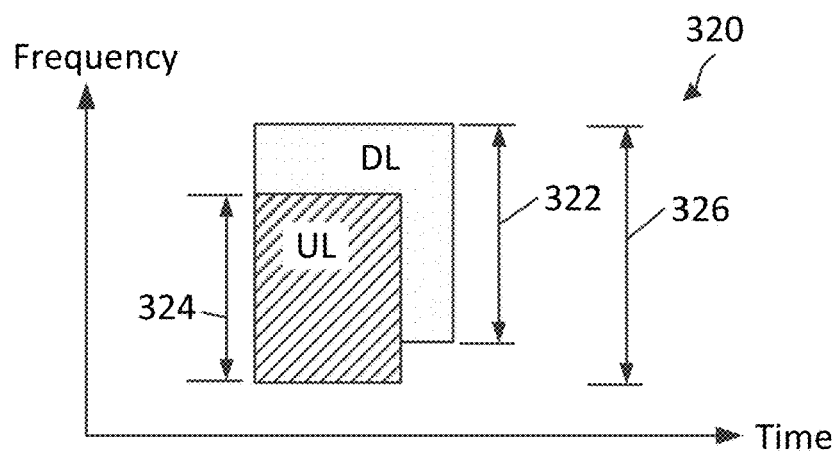
FIG. 3B illustrates a full-duplex communication configuration according to one or more aspects of the present disclosure.
Figure 3C:
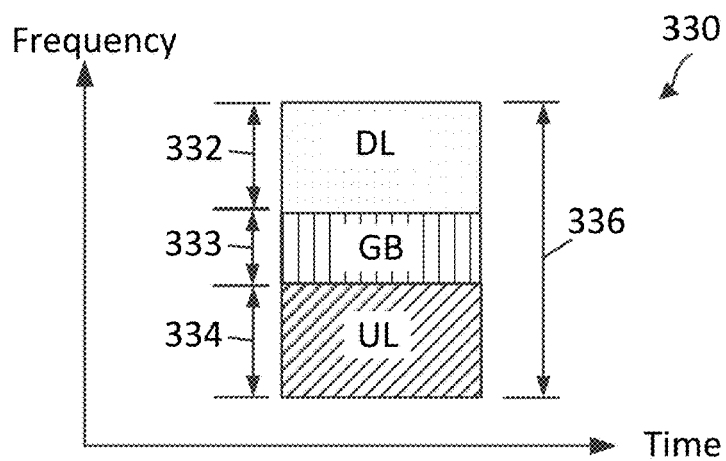
FIG. 3C illustrates a full-duplex communication configuration according to one or more aspects of the present disclosure.

A slot 202 may be configured as a DL slot with a DL band spanning a channel frequency BW, an UL slot with an UL band spanning a channel frequency BW, or a full-duplex slot including an UL band and a DL band in a channel frequency BW. FIGS. 3A-3C illustrate various full-duplex configurations.

As discussed above, the BSs 105 and/or the UEs 115 may support full-duplex communications. For instance, a BS 105 may configure a UE 115 to employ a combination of a full-duplex mode, a DL-only mode, and an UL-only mode for communications. For instance, the BS 105 may configure some transmission slots to be DL slots for DL communications and some transmission slots to be UL slots for UL communications. The BS may also configure some transmission slots to be full-duplex slots for simultaneous UL and DL communications. The DL slots, UL slots, and full-duplex slots may be in different time periods. The BS may determine whether to configure a certain slot to be a DL slot, an UL slot, or a full-duplex slot, for example, depending on traffic needs in the UL direction and in the DL direction. A DL slot may include a DL band spanning a channel frequency BW (e.g., in a single unpaired spectrum band). An UL slot may include an UL band spanning the channel frequency BW. A full-duplex slot may include an UL band and a DL band within the channel BW. The full-duplex slot can be an IBFD slot, where the UL band is fully overlapping with the DL band or partially overlapping with the DL band. Alternatively, the full-duplex slot can be an SBFD slot, where the UL band is spaced apart from the DL band in frequency by a small guard band. The IBFD and SFBD configurations will be described more fully below in relation to FIGS. 3A-3C.

FIG. 3A illustrates a full-duplex communication configuration 310 according to one or more aspects of the present disclosure. The configuration 310 may be employed by a BS 105 and a UE 115 in a network such as the network 100 in conjunction with the radio frame structure 200 for communications. In FIG. 3A, the x-axis represents time in some arbitrary units, and the y-axis represents frequency in some arbitrary units. In the configuration 310, an UL band 314 may be fully overlapping with a DL band 312 in a channel frequency BW 316 (e.g., in a single unpaired spectrum band). As shown, the UL band 314 is within the DL band 312. The UL band 314 may be used for UL transmissions by the UE 115. The DL band 312 may be used for DL transmissions by the BS 105. The configuration 310 may be referred to as an IBFD mode.

FIG. 3B illustrates a full-duplex communication configuration 320 according to one or more aspects of the present disclosure. The configuration 320 may be employed by a BS 105 and a UE 115 in a network such as the network 100 in conjunction with the radio frame structure 200 for communications. In FIG. 3B, the x-axis represents time in some arbitrary units, and the y-axis represents frequency in some arbitrary units. In the configuration 320, an UL band 324 may be partially overlapping with a DL band 322 in a channel frequency BW 326 (e.g., in a single unpaired spectrum band). The UL band 324 may be used for UL transmissions by the UE 115. The DL band 322 may be used for DL transmissions by the BS 105. The configuration 320 may also be referred to as an IBFD mode.

FIG. 3C illustrates a full-duplex communication configuration 330 according to one or more aspects of the present disclosure. The configuration 330 may be employed by a BS such as the BSs 105 and a UE such as the UEs 115 in a network such as the network 100 in conjunction with the radio frame structure 200 for communications. In FIG. 3C, the x-axis represents time in some arbitrary units, and the y-axis represents frequency in some arbitrary units. In the configuration 330, an UL band 334 may be spaced apart from a DL band 332 by a guard band 333 in a channel frequency BW 336 (e.g., in a single unpaired spectrum band). The UL band 334 may be used for UL transmissions by the UE 115. The DL band 332 may be used for DL transmissions by the BS 105. The guard band 333 may be small or narrow, for example, including about five RBs (e.g., the RBs 210). The configuration 330 may be referred to as an SFBD mode.

Transmission of data may be an autonomous (i.e., unscheduled) transmission or a scheduled transmission. For example, a BS 105 may schedule a UE 115 for UL and/or DL communications. The UE 115 may transmit an UL data signal via a scheduled UL grant (e.g., transmission in PDCCH via DCI). Additionally or alternatively, the UE 115 may receive a DL data signal via a scheduled DL grant (e.g., transmission in PDCCH via DCI). A configured UL transmission is an unscheduled transmission, performed on the channel without a scheduled UL grant. A configured UL transmission may also be referred to as a grantless, grant-free, or autonomous transmission. In some examples, the UE may transmit an UL resource via a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in, for example, an RRC configuration, without an explicit grant for each UE transmission. For example, the BS 105 may transmit a configured grant indicating a plurality of resources (e.g., configured grant resources) to the UE 115. The BS 105 may allocate configured grant resources an operational frequency band, which may include in an unlicensed frequency band and/or a licensed band, for UL or DL transmission. Rather than wait for a scheduled UL grant, the UE 115 may transmit an UL communication signal in a configured grant resource.

In some aspects, after the BS 105 transmits the configured grant indicating a configured grant resource, the BS 105 may desire to allocate the configured grant resource to another entity. For example, the BS 105 may have more urgent data to schedule for an ultra-reliable low latency communication (URLLC) UE and may transmit an UL cancellation indication to the UE 115 to instruct the UE 115 to not transmit an UL communication signal in the configured grant resource. The BS 105 may transmit an UL cancellation indication to inform the UE 115 to cancel or pause its UL transmission in the configured grant resource. The BS 105 may use the UL cancellation indication to preempt the UE 115's use of the configured grant resource and allow another entity to transmit using the configured grant resource. The UE 115 may receive the UL cancellation indication and be aware of an upcoming interrupting transmission. Accordingly, the UE 115 may cancel the UL communication signal in the configured grant resource.

Figure 4:
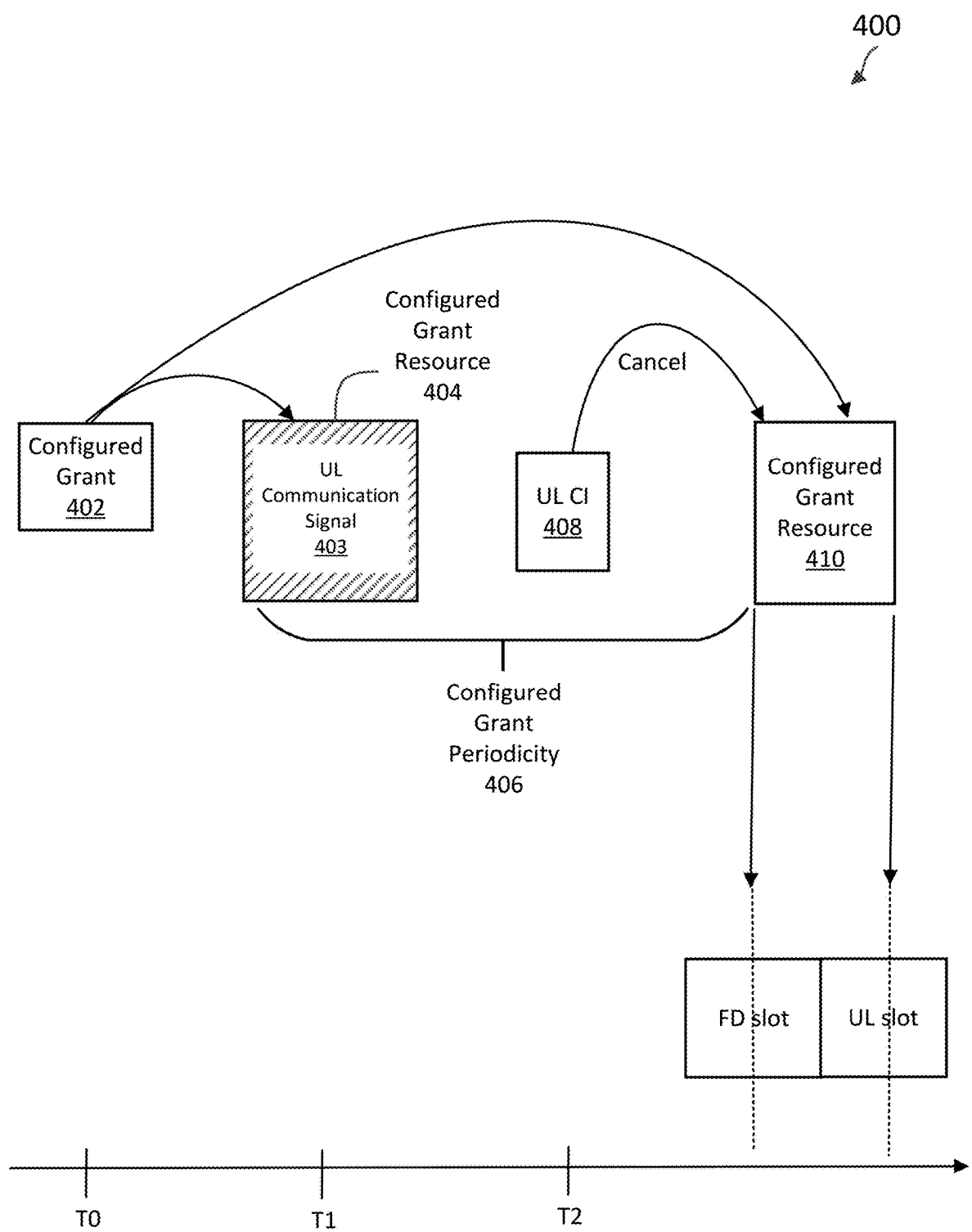
FIG. 4 illustrates an uplink (UL) cancellation indication communication method according to one or more aspects of the present disclosure.

FIG. 4 illustrates an UL cancellation indication communication method 400 according to one or more aspects of the present disclosure. The method 400 may correspond to an UL cancellation indication communication scenario in the network 100. The x-axis represents time in some arbitrary units. In the method 400, a BS 105 may transmit a configured grant 402 indicating a configured grant resource 404 and a configured grant resource 410. The BS 105 may schedule configured grant resources to be transmitted periodically, for example, at a periodicity of about 10 ms, 20 ms, 40 ms, 80 ms, or more. For example, the BS 105 may preconfigure a configured grant periodicity 406 and transmit a configuration for the configured grant resource 404 and the configured grant resource 410 in accordance with the configured grant periodicity 406.

At time T0, the UE 115 may receive the configured grant 402 from the BS 105. In some aspects, the configured grant 402 may include a separate grant for the full-duplex slots and a separate grant for the full-UL slots (e.g., one configured grant for a configured grant resource in the full-UL slot and one configured grant for a configured grant resource in the full-duplex slot). The UE 115 may determine, based on the configured grant 402, time and frequency locations (e.g., RB locations in frequency and/or symbol locations in time) of the configured grant resources 404 and 410. At time T1, the UE 115 may transmit an UL communication signal 403 in the configured grant resource 404. At time T2, the UE may receive an UL cancellation indication 408 from the BS 105 and may accordingly cancel or pause its UL transmission in the configured grant resource 410. In response to receiving the UL cancellation indication 408, the UE 115 may determine not to transmit an UL communication signal in the configured grant resource 410. In other words, the UE 115 may refrain, based on applying the UL cancellation indication, from transmitting a communication in the configured grant resource 410.

The BS 105 and/or the UE 115 may transmit an UL communication signal in one or more full-UL slots and one or more full-duplex slots. In some aspects, the UL cancellation indication 408 may reference a plurality of resources in one or more full-UL slots and one or more full-duplex slots. The configured grant resource 410 may include the plurality of resources, which may be time and/or frequency resources. The plurality of resources may fall within a portion of a full-UL slot and/or a full-duplex slot. The length of the UL bands (e.g., the frequency bandwidth of the UL band) in the full-UL slots may be different from the length of the UL bands in the full-duplex slots (e.g., UL band 334 in FIG. 3). Given that the resources are different in the full-UL slots and the full-duplex slots, it may be desirable for the UE 115 to determine whether a cancellation indication applies to the full-UL slots and/or the full-duplex slots. After the UE 115 determines whether the cancellation indication applies to the full-UL slots and/or the full-duplex slots, the UE 115 may apply the UL cancellation indication accordingly. Mechanisms for communicating UL cancellation indications and applying the UL cancellation indications are described in greater detail herein.

Figure 5:
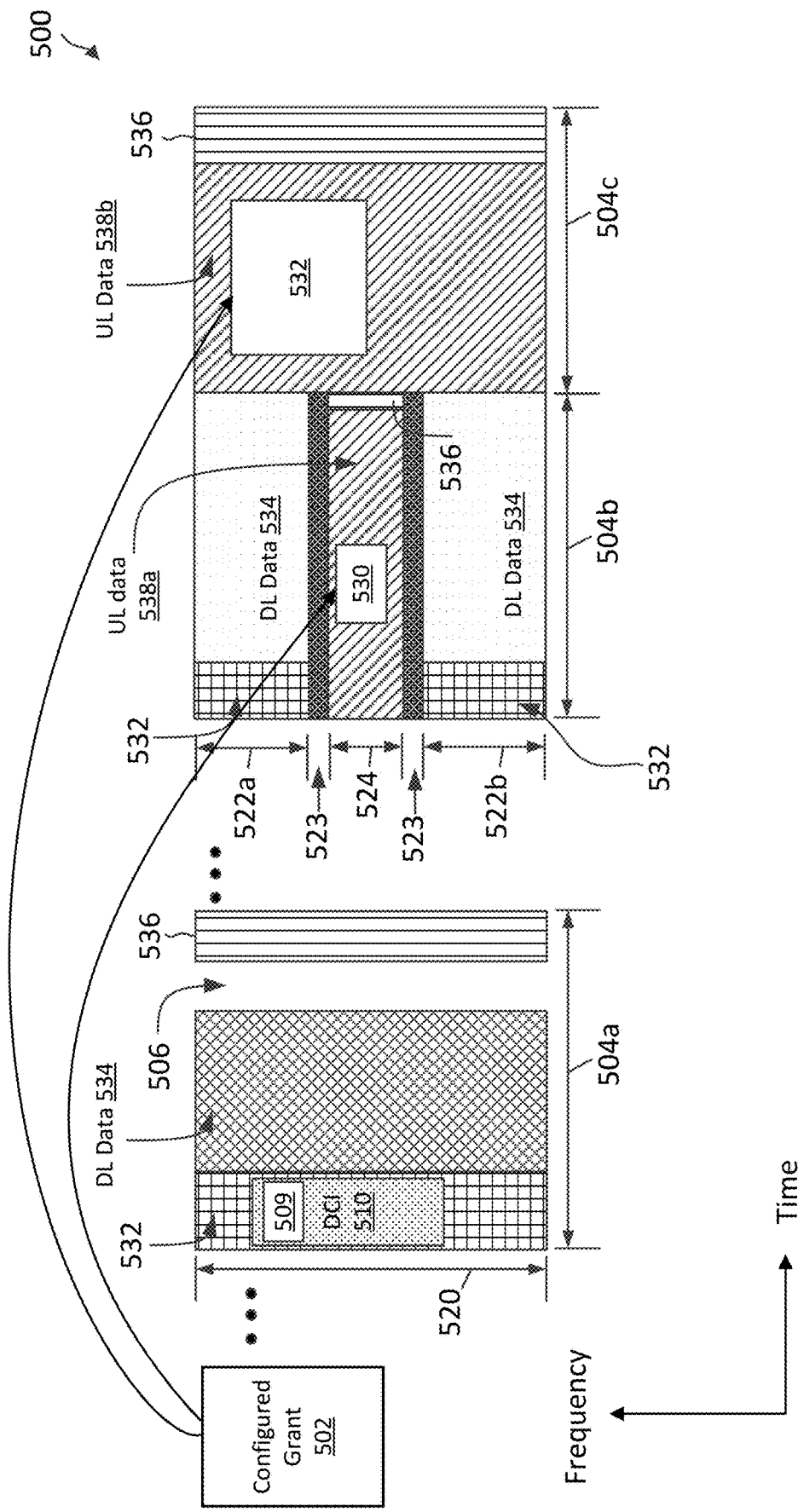
FIG. 5 illustrates an UL cancellation indication communication method according to one or more aspects of the present disclosure.

FIG. 5 illustrates an UL cancellation indication communication method 500 according to one or more aspects of the present disclosure. The method 500 may correspond to an UL cancellation indication communication scenario in the network 100. The x-axis represents time in some arbitrary units, and the y-axis represents frequency in some arbitrary units. As discussed above, the BS 105 may configure a combination of full-DL slots, full-UL slots, and/or full-duplex slots in a channel frequency BW.

In the example illustrated in FIG. 5, the BS 105 may transmit a configured grant resource 502 indicating a configured grant resource 530 and a configured grant resource 532. Each of the configured grant resources 530 and 532 may include a plurality of resources (e.g., time and/or frequency resources) that may fall within one or more full-UL slots and one or more full-duplex slots. The UE 115 may receive the configured grant resource 502 and desire to communicate an UL communication in the configured grant resource 530 and/or in the configured grant resource 532.

A DL slot 504a may include a DL band 520. The DL band 520 may correspond to a channel frequency BW (e.g., the channel frequency BW 316, 326, and/or 336). The channel frequency BW may be at any suitable frequency band (e.g., below 3 GHz, between about 3 GHz to about 6 GHz, or above 6 GHz). The channel frequency BW may include any suitable amount of frequencies (e.g., about 20 MHz, about 80 MHz, about 100 MHz or more). The DL slot 504a may correspond to a slot 202 of FIG. 2. The DL slot 504a may include a DL control portion 532, a DL data portion 534, and an UL control portion 536. Each portion 532, 534, 536 may include time-frequency resources, for example, a number of symbols 206 in time and a number of REs 212 or RBs 210 in frequency as shown in FIG. 2. When the BS 105 utilizes a combination of full-DL slots, full-UL slots, and/or full-duplex slots, the BS 105 may dynamically or semi-statically reconfigure a slot to switch among any of the full-DL slots, full-UL slots, and/or full-duplex mode(s). In other words, the BS 105 may utilize the channel frequency BW similar to a TDD mode, but may additionally configure some slots to be full-duplex slots. For instance, the BS 105 may initially configure a slot to be a full-DL slot and may subsequently reconfigure the slot to be a full-duplex slot, for example, to satisfy a latency criteria of a certain UL URLLC communication.

The BS 105 may also transmit DCI 510 (e.g., PDCCH) in the DL control portion 532. For example, the BS 105 may transmit DL data (e.g., PDSCH) in the DL data portion 534. The BS 105 may schedule a UE 115 to transmit UL control information (e.g., PUCCH including SRS, HARQ ACK/NACKs, and/or channel quality indicator (CQI)) in the UL control portion 536. The UL control portion 536 may be spaced apart from the DL data portion 534 by a gap period 506 to provide time for switching between UL and DL. The BS 105 may transmit the DCI 510 to be located at any suitable frequency in the DL band 520. In some aspects, the DCI 510 may be located at a centered band of the DL band 520. In some aspects, the DCI 510 may be located at a lower frequency portion of the DL band 520. In some aspects, DCI 510 may be located at a higher frequency portion of the DL band 520.

In the example illustrated in FIG. 5, the DCI 510 may include an UL cancellation indication 509 that references the configured grant resource 530 and/or the configured grant resource 532 in one or more full-UL slots and one or more full-duplex slots. The configured grant resource 530 falls within a full-duplex slot 504b, and the configured grant resource 532 falls within a full-UL slot 504c. The full-duplex slot 504b may include an UL band 524 located between an upper DL band 522a and a lower DL band 522b within the channel frequency BW. The UL band 524 may be spaced apart from the upper DL band 522a by a guard band 523 and may be spaced apart from the lower DL band 522b by another guard band 523. The guard bands 523 may be significantly narrower than the UL band 524 and the DL bands 522. In some instances, a guard band 523 may include about five RBs. Each of the DL band 522a, 522b, and the UL band 524 may include any suitable BW. In an example, the BW for each of the DL band 522a, 522b, and the UL band 524 can be predetermined. In another example, the BS 105 may determine the BW for each of the DL band 522a, 522b, and the UL band 524 based on traffic loading and/or latency requirements. The full-duplex slot 504b may correspond to a slot 202 of FIG. 2. The full-duplex slot 504b may include a DL control portion 532 and a DL data portion 534 in each of the DL bands 522a and 522b. The full-duplex slot 504b may include an UL data portion 538a, 538b and an UL control portion 536 in the UL band 524. Similar to the portions 532, 534, 536, the UL data portion 538 may include time-frequency resources, for example, a number of symbols 206 in time and a number of REs 212 or RBs 210 in frequency as shown in FIG. 2. The UE 115 may transmit UL data (e.g., PUSCH) in the UL data 538a or in the UL data 538b. For example, the UE 115 may transmit an UL communication signal in the configured grant resource 530 and/or in the configured grant resource 532.

In some instances, the full-duplex slot 504b may be followed by the full-UL slot 504c, which may include an UL band in the channel frequency BW and may include an UL data portion 538b followed by an UL control portion 536. In some other instances, the full-duplex slot 504b may be followed by a DL slot similar to the DL slot 504a. In general, a full-duplex slot 504b can be adjacent to a full-UL slot 504c or a DL slot 504a.

The UE 115 may receive the DCI 510 including the UL cancellation indication 509 that references the plurality of resources. One or more resources of the plurality of resources may be included in the resource 530 in the full-duplex slot 504*b* and/or in the resource 532 in the full-UL slot 504*c*. As discussed in further detail below in relation to the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1400 in FIG. 14, the UE 115 may apply an UL cancellation indication to at least one of the one or more full-UL slots (e.g., full-UL slot 504*c* in FIG. 5 or FIG. 6) or the one or more full-duplex slots (e.g., full-duplex slot in FIG. 5 or FIG. 6) based on a set of parameters and determine whether to cancel an UL communication in a first resource of the plurality of resources in the one or more full-UL slots and/or cancel an UL communication in a second resource of the plurality of resources in the one or more full-duplex slots.

Figure 6:
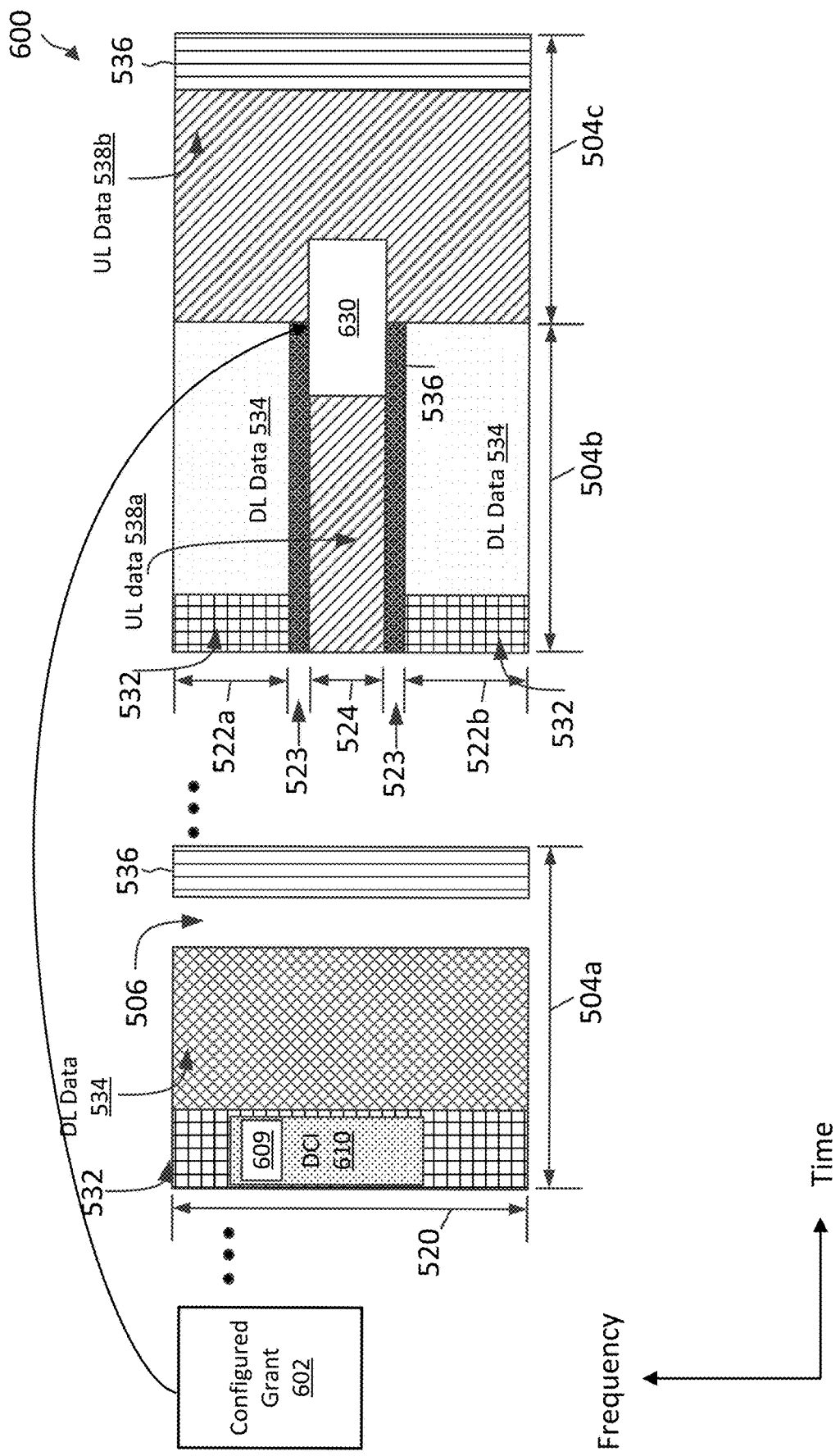
FIG. 6 illustrates an UL cancellation indication communication method according to one or more aspects of the present disclosure.

FIG. 6 illustrates an UL cancellation indication communication method 600 according to one or more aspects of the present disclosure. The method 600 may correspond to an UL cancellation indication communication scheme in the network 100. The method 600 may be employed by a BS 105 and a UE 115 in a network such as the network 100 for communications. The x-axis represents time in some arbitrary units, and the y-axis represents frequency in some arbitrary units. The method 600 may use the same reference numerals as FIG. 5 for simplicity's sake. For example, the DL slot 504*a*, the full-duplex slot 504*b*, and the full-UL slot 504*c* shown in FIG. 6 are discussed above in relation to FIG. 5.

In the example illustrated in FIG. 6, the BS 105 may transmit a configured grant 602 indicating a configured grant resource 630. The configured grant resource 630 may include a plurality or resources (e.g. time-frequency resources). Additionally, the BS 105 may transmit DCI 610 including an UL cancellation indication 609 that references the plurality of resources, which may fall within both the full-duplex slot 504*b* and the full-UL slot 504*c*. As discussed in further detail below in relation to the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1400 in FIG. 14, the UE 115 may apply an UL cancellation indication to at least one of the one or more full-UL slots (e.g., full-UL slot 504*c* in FIG. 5 or FIG. 6) or the one or more full-duplex slots (e.g., full-duplex slot in FIG. 5 or FIG. 6) based on a set of parameters and determine whether to cancel an UL communication in a first resource of the plurality of resources in the one or more full-UL slots and/or cancel an UL communication in a second resource of the plurality of resources in the one or more full-duplex slots.

In some aspects, the BS 105 may transmit an UL cancellation indication using a PDCCH DCI with a cancellation indication-radio network temporary identifier (CI-RNTI). The BS 105 may transmit a radio resource control (RRC) message to configure a UE 115 with PDCCH monitoring occasions for monitoring DCI with CI-RNTI. The PDCCH monitoring occasions may indicate time instances of a certain CORESET. In other words, the PDCCH monitoring occasions indicate time and/or frequency resource where a UE 115 may monitor for the DCI (e.g., DCI 510 in FIG. 5 or DCI 610 in FIG. 6) with the CI-RNTI. The DCI may include, for example, a DCI format 2_4. One approach for the BS 105 to notify the UE 115 about the UL cancellation indication is to utilize DCI format 2_4, which is described in 3GPP document TS 38.212 Release 16, titled "3rd Generation Partnership Project; Technical Specification Group Radio Access Network; NR; Multiplexing and channel coding," March, 2020, version 16.1.0, Section 7.3.1.3.5, which is incorporated herein by reference ("3GPP document"). In NR, DCI format 2_4 may be used for notifying the PRB(s) and OFDM symbol(s) where UE cancels the corresponding UL transmission from the UE. The DCI format 24 may include the following information, with CRC scrambled by CI-RNTI. Cancellation indication 1, Cancellation indication 2, . . . , Cancellation indication N. The size of DCI format 2_4 may be configurable by a higher-layer parameter dci-PayloadSize-forCI up to 126 bits. The number of bits for each UL cancellation indication may be configurable by a higher-layer parameter CI-PayloadSize. Although the DCI format 2_4 is discussed in the examples, it should be understood that the present disclosure is not limited to the DCI format 2_4. The present disclosure applies to any DCI formats that are described in the 3GPP document.

In response to receiving the RRC message, the UE 115 may monitor PDCCH candidates for the DCI including the UL cancellation indication. For example, the UE 115 may monitor PDCCH candidates for a DCI including the DCI format 2_4. Upon decoding a PDCCH candidate with the CI-RNTI successfully (indicating DCI format 2_4 including UL cancellation indication), the UE 115 may determine a resource cancellation configuration based on the UL cancellation indication for the plurality of resources. The resource cancellation configuration may include a set of parameters, which may include frequency parameters (e.g., a number of contiguous RBs of the plurality of resources and/or, and/or one or more RB groups) and/or time parameters (e.g., a timespan of the plurality of resources, a first number of symbols in the plurality of resources, and/or a second number of symbol groups in the first number of symbols). The UE 115 may apply the UL cancellation indication to at least one of the one or more full-UL slots or the one or more full-duplex slots based on a set of parameters. The UE 115 may refrain, based on applying the UL cancellation indication, from transmitting a communication in at least one of a first resource of the plurality of resources in the one or more full-UL slots or a second resource of the plurality of resources in the one or more full-duplex slots.

The UL cancellation indication may provide to the UE 115, a set of serving cells, by ci-ConfigurationPerServing-Cell, that includes a set of serving cell indexes and a corresponding set of locations for fields in the DCI (e.g., in the DCI format 2_4) by positionInDCL. For a serving cell having an associated field in the DCI (e.g., in the DCI format 2_4), the field may include a set of parameters. In other words, for each serving call, the set of parameters may be configured for the UE 115. A first parameter of the set of parameters may include "N_CI", which may specify a number of bits provided in a payload (e.g., DCI payload) of the UL cancellation indication (e.g., a number of bits provided by CI-PayloadSize). A second parameter of the set of parameters may include "B_CI", which may specify a number of PRBs in a frequency span of a resource to be cancelled by the UL cancellation indication (e.g., a number of PRBs provided by frequencyRegionforCI in timeFrequencyRegion). In some aspects, the B_CI parameter may specify a number of PRBs in the frequency span. A third parameter of the set of parameters may include "T_CI", which may specify a timespan of a resource to be cancelled by the UL cancellation indication (e.g., a number of symbols, excluding symbols for reception of SS/PBCH blocks and DL symbols indicated by tdd-UL-DL-Configuration-Common, provided by timeDurationforCI in timeFrequencyRegion). In some aspects, the T_CI parameter may specify a number of symbols in the timespan. A fourth parameter of the set of parameters may include "G_CI", which may represent a number of partitions or symbol groups for the timespan (e.g., T_CI symbols provided by timeGranularityforCIin timeFrequencyRegion). The set of parameters may include additional or different parameters from the N_CI, B_CI, T_CI, and/or G_CI discussed in the present disclosure.

If the serving cell is configured with a supplemental uplink (SUL) carrier, the UL cancellation indication may also provide to the UE 115, a number of fields in the DCI (e.g., in the DCI format 2_4) by positionInDCL-forSUL for each serving cell for the SUL carrier. For SUL of a serving cell, the UL cancellation indication may include an information payload size for the DCI by dci-PayloadSize-forCI and an indication for time-frequency resources by timeFrequencyRegion.

Figure 7A:
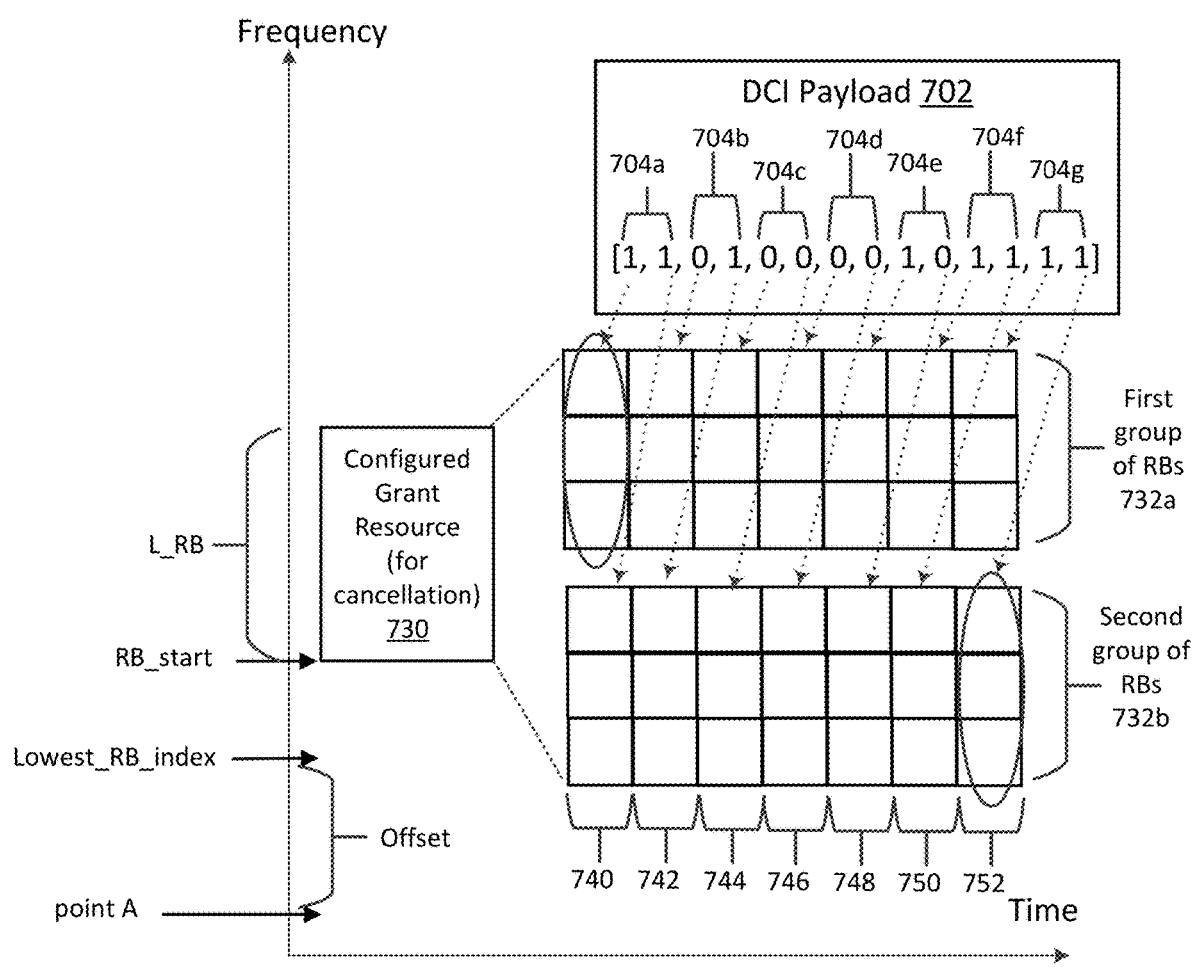
FIG. 7A illustrates a downlink control information (DCI)-to-resource mapping method according to one or more aspects of the present disclosure.

FIG. 7A illustrates a DCI-to-resource mapping method 700 according to one or more aspects of the present disclosure. The method 700 may correspond to an UL cancellation indication communication scenario in the network 100. For example, the method 700 may be employed by the BS 105 and the UE 115. The x-axis represents time in some arbitrary units, and the y-axis represents frequency in some arbitrary units. FIG. 7A shows a time-frequency resource 730 to be cancelled by UL cancellation indication DCI. In some aspects, the time-frequency resource 730 may be granted by a configured grant (e.g., configured by an RRC configuration). In some other aspects, the time-frequency resource 730 may be granted by a semi-persistent schedule (e.g., configured by an RRC configuration). In yet some other aspects, the time-frequency resource 730 may be granted by a dynamic scheduling grant (e.g., via DCI).

In the method 700, the frequency span of the time-frequency resource 730 may be indicated by a point A parameter, a lowest_RB_index parameter, an RB_start parameter, and/or an L_RB parameter. Point A may refer to an absolute frequency of the reference resource block (e.g., common resource block 0 (RB0)) and may reference or point to the common RB0 for a carrier (the lowest subcarrier of RB0). A lowest_RB_index may refer to the lowest usable subcarrier on the carrier in number of PRBs (e.g., using the subcarrierSpacing defined for this carrier). An offset between the Point A and the lowest RB_index may be an offset in the frequency domain between point A and the lowest_RB_index. The BS 105 may use the RB_start and the L_RB parameters to place the UL cancellation indication within any location of a particular frequency domain for any user within the carrier. An RB_start may reference or point to an RB for a carrier, and the L_RB may indicate a number of contiguous RBs.

In the example illustrated in FIG. 7A, a time-frequency resource 730 may include a plurality of resources. A resource of the plurality of resources may include, for example, a time and/or frequency resource. The time-frequency resource 730 may include a first group of RBs 732a and a second group of RBs 732b. The number of RB groups in the time-frequency resource 730 may vary depending on N_CI and G_CI as will be discussed more fully below. Each of the first group of RBs 732a and the second group of RBs 732b may include a plurality of groups in the time-and-frequency domain. The BS 105 may transmit an UL cancellation indication (e.g., in a two-dimensional (2D) bitmap format) that may be applied to a plurality of resources in the first group of RBs 732a and/or the second group of RBs 732b. The UE 115 may receive the UL cancellation indication and apply it to one or more resources of the plurality of resources. In some scenarios, applying UL cancellation indication information to communication resources yields those resources that are permitted for transmission and those resources for which transmission refrains may be used. Application can be done in various manners as discussed herein and vary in approach, size, and scope. A DCI payload 702 may be mapped to a frequency span and/or a timespan of a time-frequency resource 730 that is referenced by the UL cancellation indication. For example, bits in the DCI payload 702 may be mapped to time-frequency resources, for example, a number of symbols 206 in time and a number of REs 212 or RBs 210 in frequency as shown in FIG. 2. In the example illustrated in FIG. 7A, the DCI payload 702 includes [1, 1, 0, 1, 0, 0, 0, 0, 1, 0, 1, 1, 1, 1], which includes fourteen bits. For example, N_CI=14 bits are included in the DCI payload 702 (e.g., DCI format 2_4). Additionally, B_CI=28 RBs, T_CI=28 symbols, and G_CI=7 groups. Accordingly, the timespan of the UL cancellation indication may be 28 symbols, and the frequency span of the UL cancellation indication may be 28 RBs. The UE 115 may apply the DCI payload 702 to one or more groups in the timespan of 28 symbols and/or to one or more groups in the frequency span of 28 RBs.

In some aspects, the G_CI sets of bits from the N_CI bits have a one-to-one mapping with G_CI groups of symbols, where each of the first [G_CI−T_CI+⌊T_CI/G_CI⌋*G_CI] groups includes ⌊T_CI/G_CI⌋ symbols, and each of the remaining [T_CI−⌊T_CI/G_CI⌋*G_CI] groups includes ⌈T_CI/G_CI⌉ symbols, where "⌊ ⌋" denotes a floor operation and "⌈ ⌉" denotes a ceiling operation. Additionally, each set of the G_CI sets of bits includes a "N_BI" number of bits, where N_BI=(N_CI/G_CI). In the example illustrated in FIG. 7A, the N_CI payload bits (e.g., 14) includes G_CI (e.g., 7) sets of bits. The 7 sets of bits from the 14 bits in the DCI payload 702 have a one-to-one mapping with 7 groups of symbols, where each of the first 7 groups includes 4 symbols. Additionally, each set of the 7 sets of bits includes 2 bits (e.g., N_BI=14/7=2). For example, in the DCI payload 702, a first bit set 704a includes the 2 bits [1, 1], a second bit set 704b includes the 2 bits [0, 1], a third bit set 704c includes the 2 bits [0, 0], a fourth bit set 704d includes the 2 bits [0, 0], a fifth bit set 704e includes the 2 bits [1, 0], a sixth bit set 704f includes the 2 bits [1, 1], and a seventh bit set 704g includes the 2 bits [1, 1]. The UE 115 may determine a symbol duration with respect to an SCS configuration of an active DL BWP, where the UE 115 monitors PDCCH for the DCI detection (e.g., the DCI format 2_4). For example, the UE 115 may determine that the timespan of 28 symbols is partitioned into 7 groups (e.g., G_CI=7), with each group of the 7 groups of symbols including 4 symbols. The UE 115 may determine a start of the T_CI (e.g., the first symbol). For example, an offset between detection of the DCI (PDCCH) and the start of the T_CI may be predetermined and/or known by the UE 115 (e.g., based on an RRC-configured value).

There is a one-to-one mapping between each bit in a set and N_BI (e.g., 2) groups of RBs. In some aspects, for a group of symbols, N_BI=N_CI/G_CI bits from each set of G_CI sets have a one-to-one mapping with N_BI groups of PRBs, where each of the first [N_BI−B_CI+⌊B_CI/N_BI⌋*N_BI] groups includes ⌊B_CI/N_BI⌋ PRBs, and each of the remaining [B_CI−(B_CI/N_BI)*N_BI] groups includes ⌈B_CI/N_BI⌉ PRBs. The UE 115 may determine a first PRB index in accordance with equation (1):

$$N\_RFR^{start} = O\_carrier + RB\_start \quad (1),$$

where $N\_RFR^{start}$ represents the first PRB index, O_carrier represents an offset from a reference frequency (e.g., point A in FIG. 7A), and RB_start represents a starting frequency of the frequency span.

The UE 115 may determine a number of contiguous RBs in accordance with equation (2):

$$N\_RFR^{size}=L\_RB \qquad (2),$$

where $N\_RFR^{size}$ represents the number of contiguous RBs, L_RB represents a length of the frequency span starting from the RB_start.

In the example illustrated in FIG. 7A, for a group of symbols, 2 bits (e.g., N_BI=14/7=2) from each set of the 7 sets have a one-to-one mapping with 2 groups of PRBs, which includes the first group of RBs 732a and the second group of RBs 732b. Accordingly, the frequency span of the UL cancellation indication may be partitioned into two groups. For example, each of the 2 groups of RBs includes 14 PRBs (e.g., 28/2=14).

Each bit of the bit sets 704a, 704b, 704c, 704d, 704e, 704f, and 704g may be applied to one of the first group of RBs 732a or the second group of RBs 732b. Additionally, an applied bit "1" indicates to the UE 115 to cancel a transmission or refrain from transmitting a communication in the corresponding RB-symbol group. An applied bit "0" indicates to the UE 115 that the corresponding RB-symbol group is not cancelled.

For example, the UE 115 may apply a first bit "1" in the first bit set 704a [1, 1] to the first group of RBs 732a and may apply a second bit "1" in the first bit set 704a [1, 1] to the second group of RBs 732b within a first symbol group 740. The first symbol group 740 corresponds to the first column of the first group of RBs 732a and the second group of RBs 732b. Accordingly, the UE applies the UL cancellation indication to the first group of RBs 732a and the second group of RBs 732b within the first symbol group 740. For example, the UE 115 may cancel a transmission or refrain from transmitting a communication in the first group of RBs 732a and in the second group of RBs 732b within the first symbol group 740.

The UE 115 may apply a first bit "0" in the second bit set 704b [0, 1] to the first group of RBs 732a and may apply a second bit "1" in the second bit set 704b [0, 1] to the second group of RBs 732b within a second symbol group 742. The second symbol group 742 corresponds to the second column of the first group of RBs 732a and the second group of RBs 732b. Accordingly, the UE applies the UL cancellation indication to the second group of RBs 732b within the second symbol group 742 but does not apply the UL cancellation indication to the first group of RBs 732a within the second symbol group 742. For example, the UE may cancel a transmission or refrain from transmitting a communication in the second group of RBs 732b within the second symbol group 742. The UE 115 may transmit a communication in the first group of RBs 732a within the second symbol group 742 if the UE 115 has a transmission.

The UE 115 may apply a first bit "0" in the third bit set 704c [0, 0] to the first group of RBs 732a and may apply a second bit "0" in the third bit set 704c [0, 0] to the second group of RBs 732b within a third symbol group 744. The third symbol group 744 corresponds to the third column of the first group of RBs 732a and the second group of RBs 732b. Accordingly, the UE does not apply the UL cancellation indication to the first group of RBs 732a or the second group of RBs 732b within the third symbol group 744. For example, the UE 115 may transmit a communication in the first group of RBs 732a and the second group of RBs 732b within the third symbol group 744 if the UE 115 has a transmission.

The UE 115 may apply a first bit "0" in the fourth bit set 704d [0, 0] to the first group of RBs 732a and may apply a second bit "0" in the fourth bit set 704d [0, 0] to the second group of RBs 732b within a fourth symbol group 746. The fourth symbol group 746 corresponds to the fourth column of the first group of RBs 732a and the second group of RBs 732b. The UE 115 may apply a first bit "1" in the fifth bit set 704e [1, 0] to the first group of RBs 732a and may apply a second bit "0" in the fifth bit set 704e [1, 0] to the second group of RBs 732b within a fifth symbol group 748. The fifth symbol group 748 corresponds to the fifth column of the first group of RBs 732a and the second group of RBs 732b. The UE 115 may apply a first bit "1" in the sixth bit set 704f [1, 1] to the first group of RBs 732a and may apply a second bit "1" in the sixth bit set 704f [1, 1] to the second group of RBs 732b within a sixth symbol group 750. The sixth symbol group 750 corresponds to the sixth column of the first group of RBs 732a and the second group of RBs 732b. The UE 115 may apply a first bit "1" in the seventh bit set 704g [1, 1] to the first group of RBs 732a and may apply a second bit "1" in the seventh bit set 704g [1, 1] to the second group of RBs 732b within a seventh symbol group 752. The seventh symbol group 752 corresponds to the seventh column of the first group of RBs 732a and the second group of RBs 732b.

If the UE 115 has a transmission scheduled in the UL that collides with a time-frequency group and the bit applied to the time-frequency group is 1, then the UE 115 may determine not to transmit an UL communication in at least one of a first resource (e.g., time or frequency resource) of the plurality of resources in the one or more full-UL slots or a second resource (e.g., time or frequency resource) of the plurality of resources in the one or more full-duplex slots.

The number of UL resources may change between the full-UL slots and the full-duplex slots. For example, referring back to FIGS. 5 and 6, the length (e.g., number of RBs) of the full-UL slots and the full-duplex slots are different. If the UE 115 receives an UL cancellation indication that references a full-UL slot or a full-duplex slot, the frequency span and/or the timespan of the plurality of resources (e.g., frequency span of a resource to be cancelled by the UL cancellation indication and/or timespan of a resource to be cancelled by the UL cancellation indication) may fall within the full-duplex slot and/or the full-UL slot. The present disclosure provides techniques for the BS 105 and/or the UE 115 to determine how to apply the UL cancellation indication, given that the full-UL slots and the full-duplex slots have different lengths. The BS 105 and/or the UE 115 may communicate in accordance with the aspects of the mapping methods 700 and/or 760 in FIGS. 7A, 7B.

Figure 7B:
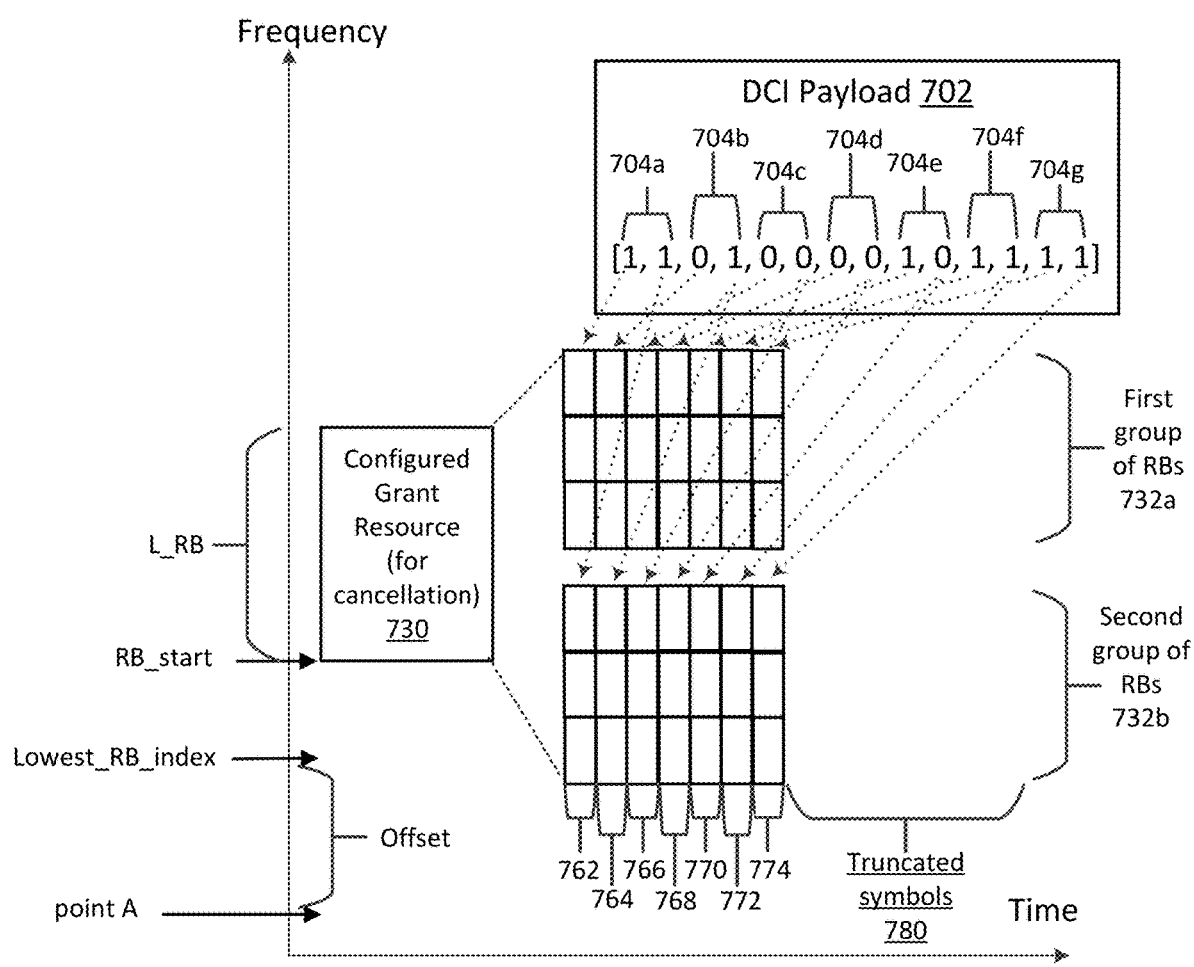
FIG. 7B illustrates a downlink control information (DCI)-to-resource mapping method according to one or more aspects of the present disclosure.

FIG. 7B illustrates a DCI-to-resource mapping method 760 according to one or more aspects of the present disclosure. The method 760 may correspond to an UL cancellation indication communication scenario in the network 100. For example, the method 760 may be employed by the BS 105 and/or the UE 115. The x-axis represents time in some arbitrary units, and the y-axis represents frequency in some arbitrary units. The mapping method 760 of FIG. 7B may include aspects similar to mapping method 700 of FIG. 7A, but the method 760 includes a truncation of the time-frequency grid in accordance with the present disclosure.

In this regard, the UE 115 may form the time-frequency grid by truncating the initial time-frequency grid, potentially providing a better indication granularity in time and frequency. In some examples, for the bit sequence for one or more full-UL slots, the UE 115 may truncate the initial time-frequency grid by removing the symbols that are in the full-duplex slots and then form the time-frequency grid. Accordingly, the formed time-frequency grid may be devoid of symbols that are in the full-duplex slots. Similarly, for the bit sequence for one or more full-duplex slots, the UE 115 may truncate the initial time-frequency grid by removing the symbols that are in the full-UL slots and then form the time-frequency grid. Accordingly, the formed time-frequency grid may be devoid of symbols that are in the full-UL slots.

As shown in FIG. 7B, the UE 115 may form the time-frequency grid by mapping each bit of the bit sets 704a, 704b, 704c, 704d, 704e, 704f, and 704g to one of the first group of RBs 732a or the second group of RBs 732b in a similar manner to FIG. 7A described above. For example, the bits of the bit sets 704a, 704b, 704c, 704d, 704e, 704f, and 704g can be mapped to symbols 762, 764, 766, 768, 770, 772, and 774 as shown in FIG. 7B. Because, in accordance with the method 760, the UE 115 can truncate or remove one or more symbols (e.g., truncated symbols 780) from the initial time-frequency grid (e.g., by removing symbols in full-duplex slots, by removing symbols in full-UL slots, etc.) the UE 115 does not map the bits of the bit sets 704a, 704b, 704c, 704d, 704e, 704f, and 704g to the truncated symbols 780. Accordingly, the UE 115 may map the bits of the bit sets 704a, 704b, 704c, 704d, 704e, 704f, and 704g to the symbols associated with one or more full-UL slots, where the truncated symbols 780 represent symbols for one or more full-duplex slots. Similarly, the UE 115 may map the bits of the bit sets 704a, 704b, 704c, 704d, 704e, 704f, and 704g to the symbols associated with one or more full-duplex slots, where the truncated symbols 780 represent symbols for one or more full-UL slots.

Figure 8:
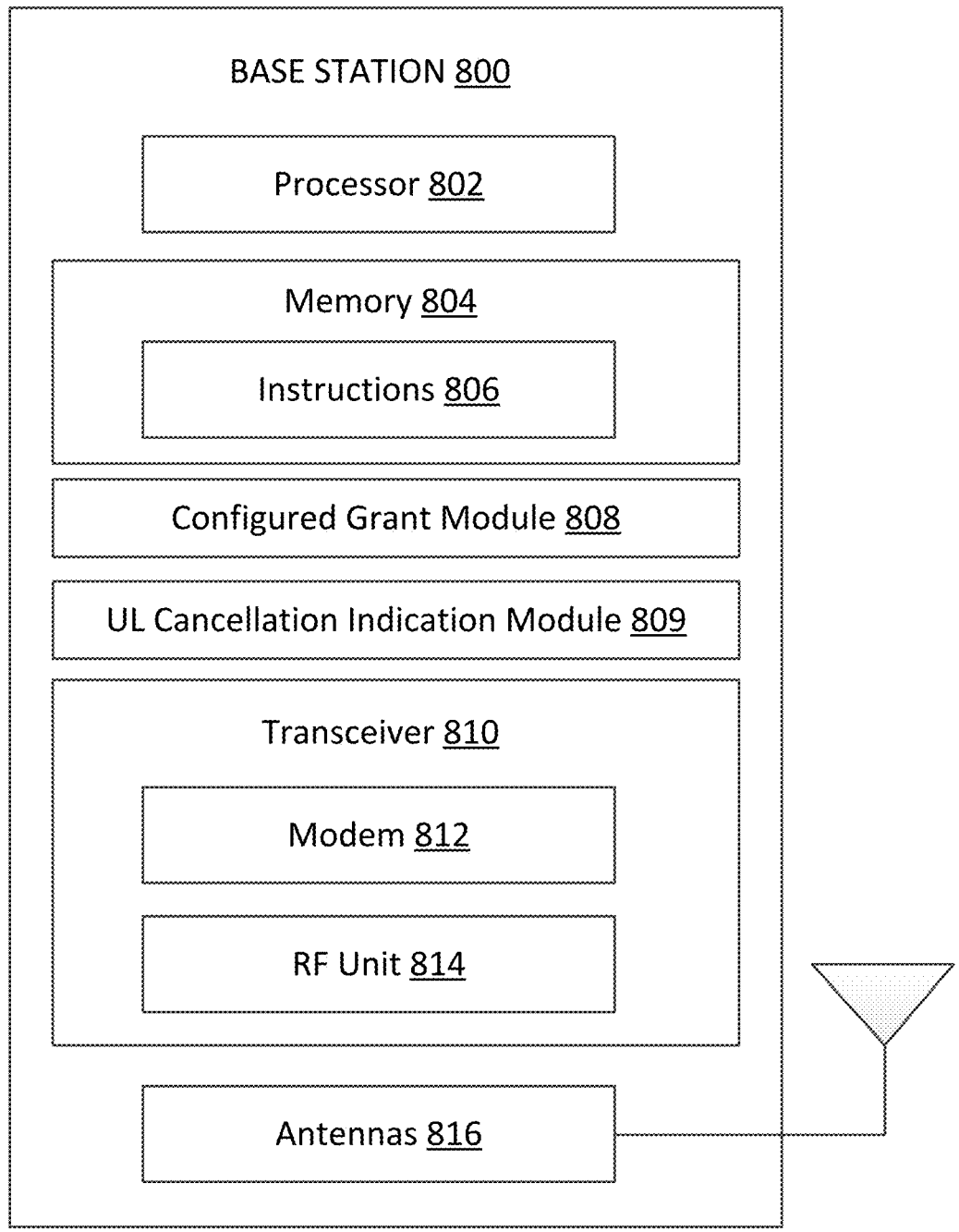
FIG. 8 illustrates a block diagram of an example base station (BS) according to one or more aspects of the present disclosure.

FIG. 8 illustrates a block diagram of an example BS 800 according to one or more aspects of the present disclosure. The BS 800 may be a BS 105 in the network 100 as discussed above in FIG. 1. As shown, the BS 800 may include a processor 802, a memory 804, a configured grant module 808, an UL cancellation indication module 809, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2, 3A-3C, 4-7B, 10, 12, and 15-18. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the configured grant module 808 and the UL cancellation indication module 809 may be implemented via hardware, software, or combinations thereof. For example, each of the configured grant module 808 and the UL cancellation indication module 809 may be implemented as a processor, circuit, and/or instructions 806 stored in the memory 804 and executed by the processor 802. In some examples, the configured grant module 808 and the UL cancellation indication module 809 can be integrated within the modem subsystem 812. For example, the configured grant module 808 and the UL cancellation indication module 809 can be implemented by a combination of software components (e.g., executed by a DSP or a general processor) and hardware components (e.g., logic gates and circuitry) within the modem subsystem 812. In some examples, a BS may include one of the configured grant module 808 and the UL cancellation indication module 809. In other examples, a BS may include both the configured grant module 808 and the UL cancellation indication module 809.

The configured grant module 808 and the UL cancellation indication module 809 may be used for various aspects of the present disclosure, for example, aspects of 2, 3A-3C, 4-7B, 10, 12, and 15-18. The configured grant module 808 may be configured to transmit DCI to a first UE, the DCI including an UL cancellation indication that references a plurality of resources in one or more full-UL slots and one or more full-duplex slots. In some aspects, a configured grant may indicate the plurality of resources and may reference a configured grant resource that includes the plurality of resources. A resource of the plurality of resources may be in the time domain and/or the frequency domain. The UL cancellation indication module 809 may be configured to schedule a second UE for an UL transmission in the one or more full-UL slots and the one or more full-duplex slots. The second UE may have higher priority data than the first UE.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data from the memory 804 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC configuration, PDCCH monitoring occasion configuration, scheduling grant, configured grant, DCI, UL cancellation indication, a set of parameters associated with the plurality of resources, etc.) from the modem subsystem 812 (on outbound transmissions) or of transmissions originating from another source such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., PUSCH, PDCCH, etc.) to the configured grant module 808 and/or the UL cancellation indication module 809 for processing. The antennas 816 may include multiple antennas of similar or different designs in order to sustain multiple transmission links.

In some aspects, the transceiver 810 is configured to transmit a configured grant resource indicating a plurality of resources, for example, by coordinating with the configured grant module 808. In some aspects, the transceiver 810 is configured to transmit DCI to a first UE, for example, by coordinating with the configured grant module 808. The DCI may include an UL cancellation indication that references the plurality of resources in one or more full-UL slots and one or more full-duplex slots. In some aspects, the processor 802 is configured to schedule a second UE for an UL transmission in the one or more full-UL slots and the one or more full-duplex slots.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
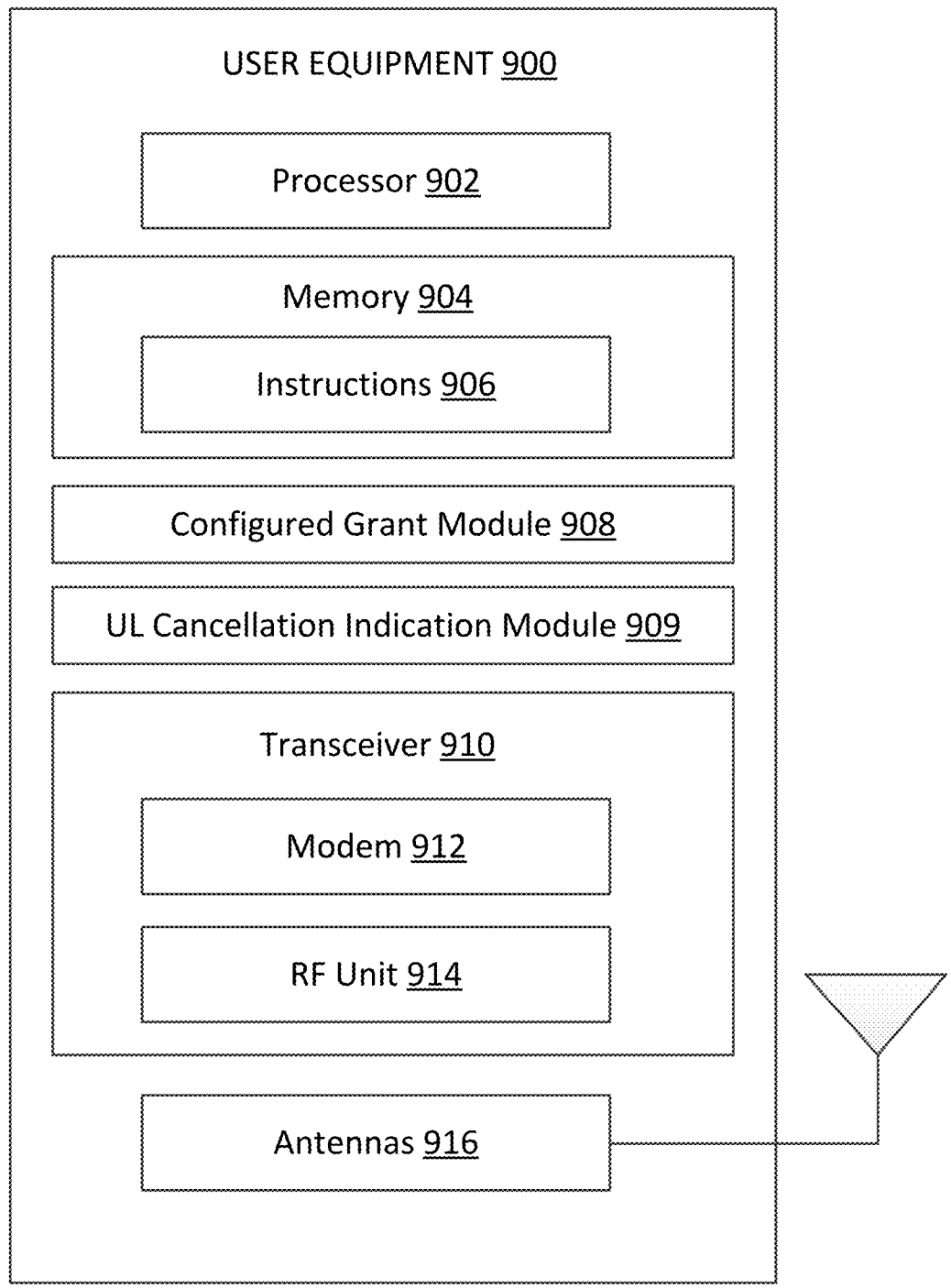
FIG. 9 illustrates a block diagram of an example user equipment (UE) according to one or more aspects of the present disclosure.

FIG. 9 illustrates a block diagram of an example UE 900 according to one or more aspects of the present disclosure. The UE 900 may be a UE 115 as discussed above with respect to FIG. 1. As shown, the UE 900 may include a processor 902, a memory 904, a configured grant module 908, an UL cancellation indication module 909, a transceiver 910 including a modem subsystem 912 and a radio frequency (RF) unit 914, and one or more antennas 916. These elements may be in direct or indirect communication with each other, for example via one or more buses.

The processor 902 may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UEs 115 in connection with aspects of the present disclosure, for example, aspects of FIGS. 2, 3A-3C, 4-7B, 10-18. Instructions 906 may also be referred to as program code, which may be interpreted broadly to include any type of computer-readable statement(s) as discussed above with respect to FIG. 8.

Each of the configured grant module 908 and the UL cancellation indication module 909 may be implemented via hardware, software, or combinations thereof. For example, each of the configured grant module 908 and the UL cancellation indication module 909 may be implemented as a processor, circuit, and/or instructions 906 stored in the memory 904 and executed by the processor 902. In some examples, the configured grant module 908 and the UL cancellation indication module 909 can be integrated within the modem subsystem 912. For example, the configured grant module 908 and the UL cancellation indication module 909 can be implemented by a combination of software components (e.g., executed by a DSP or a general processor) and hardware components (e.g., logic gates and circuitry) within the modem subsystem 912. In some examples, the UE 900 may include one of the configured grant module 908 and the UL cancellation indication module 909. In other examples, the UE 900 may include both the configured grant module 908 and the UL cancellation indication module 909.

The configured grant module 908 and the UL cancellation indication module 909 may be used for various aspects of the present disclosure, for example, aspects of FIGS. 2, 3A-3C, 4-7B, 10-18. The configured grant module 908 may be configured to receive DCI from a BS, the DCI including an UL cancellation indication that references the plurality of resources in one or more full-UL slots and one or more full-duplex slots. In an example, the configured grant module 908 may receive a configured grant indicating the plurality of resources. The UL cancellation indication module 909 may be configured to apply the UL cancellation indication to at least one of the one or more full-UL slots or the one or more full-duplex slots based on a set of parameters. The UL cancellation indication module 909 may be configured to refrain, based on applying the UL cancellation indication, from transmitting a communication in at least one of a first resource of the plurality of resources in the one or more full-UL slots or a second resource of the plurality of resources in the one or more full-duplex slots.

As shown, the transceiver 910 may include the modem subsystem 912 and the RF unit 914. The transceiver 910 can be configured to communicate bi-directionally with other devices, such as the BSs 105 and/or another core network element. The modem subsystem 912 may be configured to modulate and/or encode the data from the memory 904, the configured grant module 908, and/or the UL cancellation indication module 908 according to an MCS, e.g., an LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PUCCH, PUSCH, etc.) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may include one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., RRC configuration, PDCCH monitoring occasion configuration, scheduling grant, configured grant, DCI, UL cancellation indication, a set of parameters associated with the plurality of resources) to the configured grant module 908 and/or the UL cancellation indication module 909 for processing. The antennas 916 may include multiple antennas of similar or different designs in order to sustain multiple transmission links. The RF unit 914 may configure the antennas 916.

In some aspects, the transceiver 910 is configured to receive DCI including an UL cancellation indication that references a plurality of resources in one or more full-UL slots and one or more full-duplex slots, for example, by coordinating with the configured grant module 908. In some aspects, the processor 902 is configured to apply the UL cancellation indication to at least one of the one or more full-UL slots or the one or more full-duplex slots based on a set of parameters, for example, by coordinating with the UL cancellation indication 909. In some aspects, the processor 902 is configured to refrain, based on applying the UL cancellation indication, from transmitting a communication in at least one of a first resource of the plurality of resources in the one or more full-UL slots or a second resource of the plurality of resources in the one or more full-duplex slots, for example, by coordinating with the UL cancellation indication 909.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

In some aspects, the UE 115 is not expected to receive an UL cancellation indication with a timespan (e.g., T_CI) including both full-UL slots and full-duplex slots. In other words, the UE 115 may expect the UL cancellation indication to reference a plurality of resources in one or more full-UL slots or one or more full-duplex slots, but not both the full-UL slots and full-duplex slots. The scheduler (e.g., BS 105) may be unduly restricted by ensuring that the plurality of resources does not fall within both a full-UL slot and a full-duplex slot. Accordingly, it may be desirable to allow the scheduler to transmit an UL cancellation indication that references a plurality of resources in one or more full-UL slots and/or one or more full-duplex slots and allow the UE 115 to determine how to apply the UL cancellation indication to the plurality of resources. If the UL cancellation indication references a plurality of resources in one or more full-UL slots and/or one or more full-duplex slots, the UE 115 may apply the UL cancellation indication in the time-frequency domain using various techniques.

The UE 115 may apply the UL cancellation indication to the one or more full-UL slots or the one or more full-duplex slots based on a set of parameters. The set of parameters may include a timespan of the plurality of resources. For example, the set of parameters may specify at least one of a first number of symbols (e.g., T_CI) in the time resource domain and/or a second number of symbol groups (e.g., G_CI) in the first number of symbols. The same T_CI and G_CI parameters may be applied when the plurality of resources is in one or more full-UL slots or in one or more full-duplex slots. For instance, the first number of symbols and/or the second number of symbol groups in the first number of symbols may be the same for the one or more full-UL slots and the one or more of full-duplex slots. In some aspects, the UE 115 may determine that the timespan is in the one or more full-UL slots and may apply, based on the determination that the timespan is in the one or more full-UL slots, the UL cancellation indication to the timespan for the one or more full-UL slots. Accordingly, the UE 115 may refrain from transmitting the communication in a first resource of the plurality of resources in the one or more full-UL slots. In some aspects, the UE 115 may determine that the timespan is in the one or more full-duplex slots and may apply, based on the determination that the timespan is in the one or more full-duplex slots, the UL cancellation indication to the timespan for the one or more full-duplex slots. Accordingly, the UE 115 may refrain from transmitting the communication in a second resource of the plurality of resources in the one or more full-duplex slots. Various mechanisms for applying the UL cancellation indication to at least one of the one or more full-UL slots or the one or more full-duplex slots based on a set of parameters are described herein.

Figure 10:
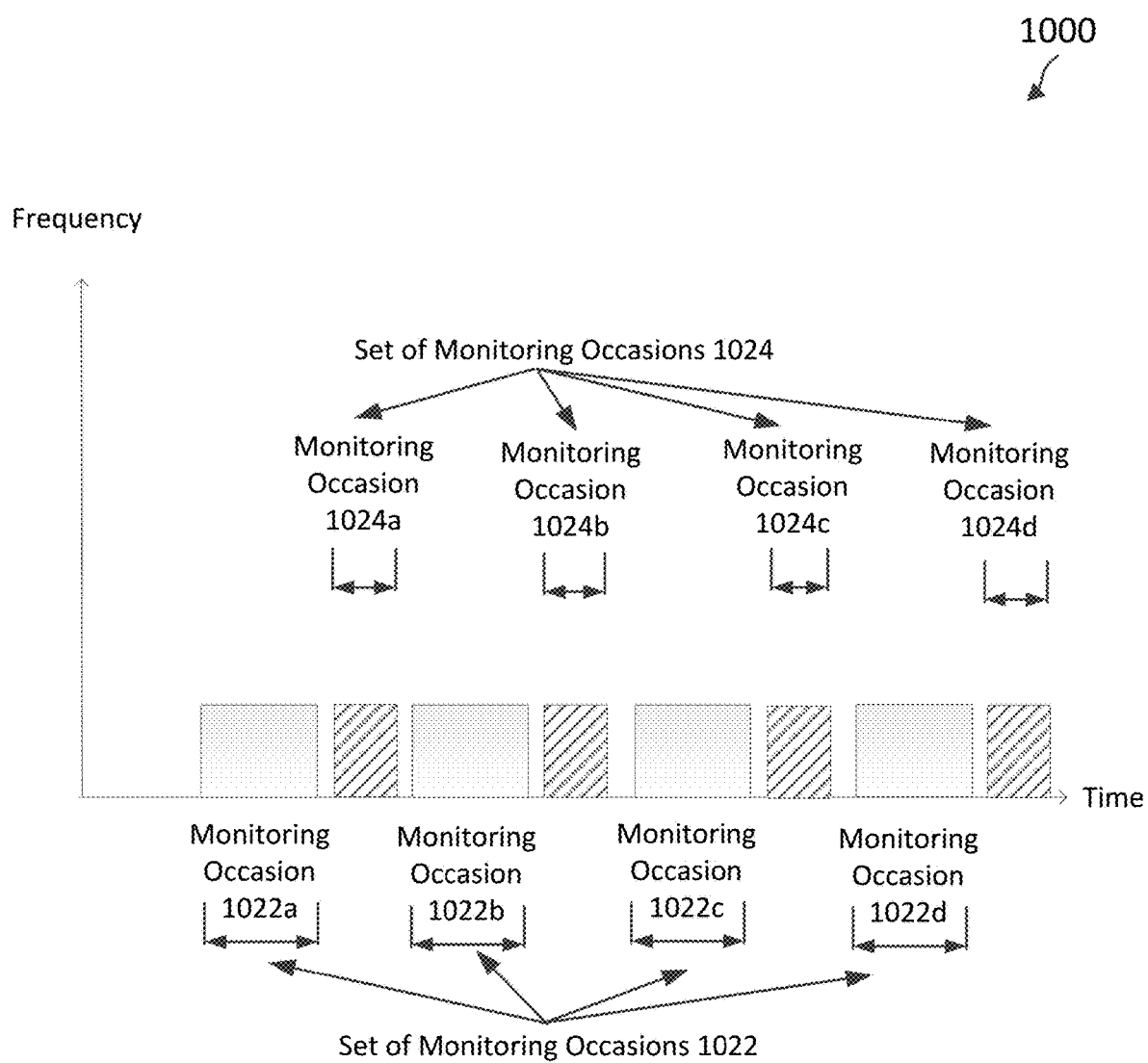
FIG. 10 illustrates a monitoring occasion configuration including two sets of monitoring occasions according to one or more aspects of the present disclosure.
Figure 12:
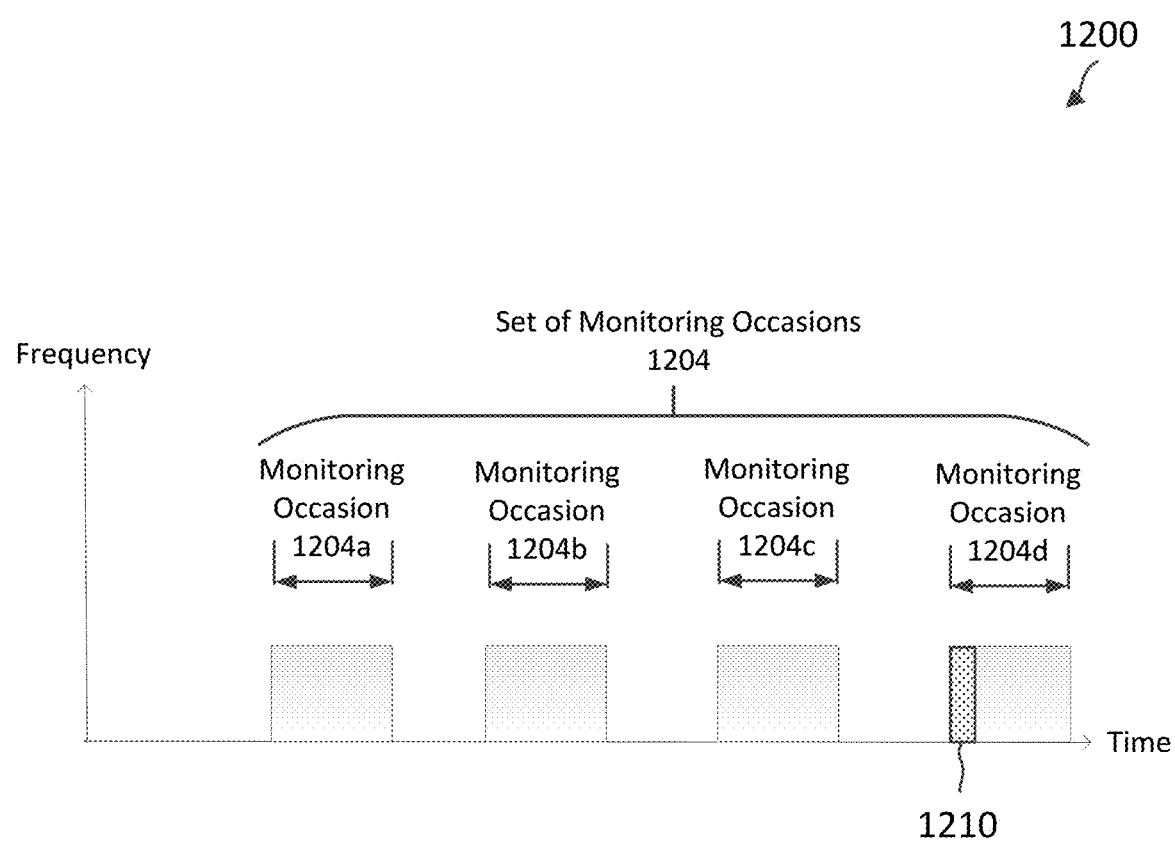
FIG. 12 illustrates a monitoring occasion configuration associated with full-duplex slots and full-UL slots according to one or more aspects of the present disclosure.

FIGS. 10 and 12 illustrate various monitoring occasion configurations. The BS 105 may configure various monitoring occasion configurations. For example, the BS 105 may determine how to schedule the UL cancellation indication and select which monitoring occasion to send the UL cancellation indication. Additionally or alternatively, the BS 105 may determine whether the UE 115 will receive or not receive resources from the full-UP or full-duplex slots. For example, if the BS 105 desires to reschedule another UE in a full-UL slot and/or a full-duplex slot, the BS 105 may determine the DCI_2_4 and in which monitoring occasion to send the DCI. The UE 115 may determine a monitoring occasion configuration and monitor, based on the monitoring occasion configuration, for DCI including the UL cancellation indication.

FIG. 10 illustrates a monitoring occasion configuration 1000 including two sets of monitoring occasions according to one or more aspects of the present disclosure. The BS 105 and the UE 115 may communicate in accordance with the monitoring occasion configuration 1000. The x-axis represents time in some arbitrary units, and the y-axis represents frequency resource in some arbitrary units.

In the example illustrated in FIG. 10, the BS 105 may configure a first set of monitoring occasions 1022 for one or more UEs 115 to monitor for DCI including an UL cancellation indication corresponding to full-UL slots and may configure a second set of monitoring occasions 1024 for one or more UEs 115 to monitor for DCI including an UL cancellation indication corresponding to full-duplex slots. For example, if the BS 105 desires to reschedule another UE in a full-UL slot and/or a full-duplex slot in the first set of monitoring occasions 1022 or the second set of monitoring occasions 1024, the BS 105 may determine the DCI_2_4 and in which monitoring occasion of the first or second set of monitoring occasions to send the DCI.

The first set of monitoring occasions 1022 includes a monitoring occasion 1022a, a monitoring occasion 1022b, a monitoring occasion 1022c, and a monitoring occasion 1022d. The second set of monitoring occasions 1024 includes a monitoring occasion 1024a, a monitoring occasion 1024b, a monitoring occasion 1024c, and a monitoring occasion 1024d. Each of the first set of monitoring occasions 1022 and the second set of monitoring occasions 1024 may include fewer or more than the four monitoring occasions shown in FIG. 10. Additionally, the first set of monitoring occasions 1022 and the second set of monitoring occasions 1024 may include the same number of monitoring occasions or a different number of monitoring occasions relative to each other. Although the first set of monitoring occasions 1022 and the second set of monitoring occasions 1024 are shown as being in the same frequency resources (e.g., same RBs), in other aspects the two sets of monitoring occasions may be in different frequency resources and/or may be at least partially overlapping in time and/or frequency. In some instances, the first set of monitoring occasions 1022 and the second set of monitoring occasions 1024 may also be in different frequency carriers, for example, when carrier aggregation is used.

In some aspects, the BS 105 may configure the first set of monitoring occasions 1022 for exclusive full-UL slot scheduling and configure the second set of monitoring occasions 1024 for exclusive full-duplex slot scheduling. The BS 105 may transmit to a first UE, the DCI including the UL cancellation indication in a monitoring occasion of the first set of monitoring occasions 1022 or the second set of monitoring occasions 1024. Additionally, the BS 105 may schedule a second UE for an UL transmission in the one or more full-UL slots and the one or more full-duplex slots. The BS 105 may schedule the second UE for an UL transmission in one or more full-UL slots if the DCI is transmitted in the monitoring occasion of the first set of monitoring occasions. Alternatively, the BS 105 may schedule the second UE for an UL transmission in one or more full-duplex slots if the DCI is transmitted in the monitoring occasion of the second set of monitoring occasions.

Figure 11:
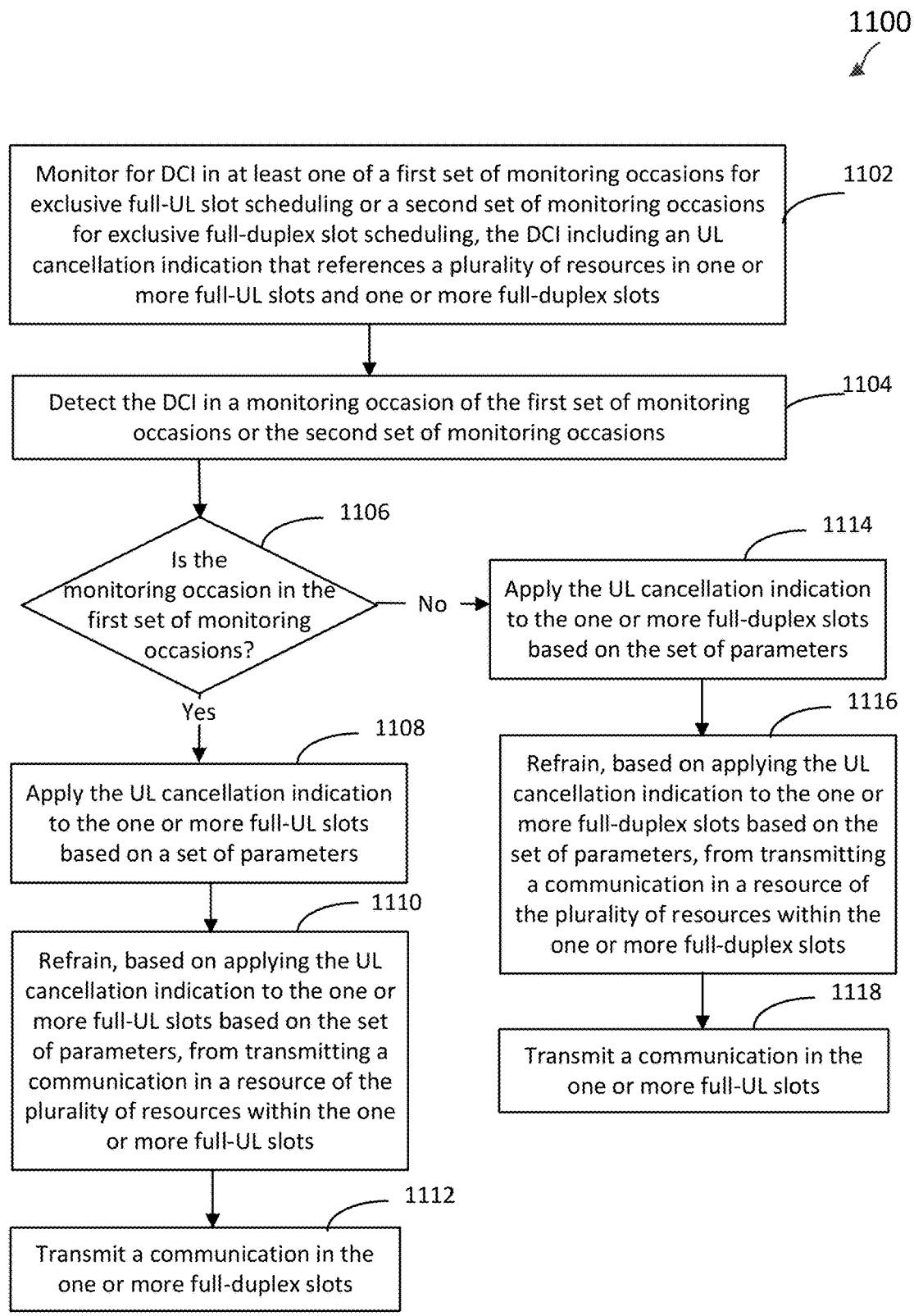
FIG. 11 illustrates a flow diagram of a method of applying an UL cancellation indication based on detecting DCI in a monitoring occasion of a first set of monitoring occasions or a second set of monitoring occasions according to one or more aspects of the present disclosure.

FIG. 10 will be discussed relative to FIG. 11 (and vice versa) to better understand concepts related to applying the UL cancellation indication to the full-UL slots and/or the full-duplex slots in relation to the first set of monitoring occasions 1022 and the second set of monitoring occasions 1024. FIG. 11 illustrates a flow diagram of a method 1100 of applying the UL cancellation indication based on detecting the DCI in a monitoring occasion of the first set of monitoring occasions 1022 or the second set of monitoring occasions 1024 according to one or more aspects of the present disclosure. Blocks of the method 1100 can be executed by a computing device (e.g., a processor, processing circuit, and/or other suitable component) of a wireless communication device. In some aspects, the wireless communication device is a UE (e.g., UEs 115 and/or UE 900) that may utilize one or more components, such as the processor 902, the memory 904, the configured grant module 908, the UL cancellation indication module 909, the transceiver 910, and/or the antennas 916 to execute the blocks of the method 1100. The method 1100 may employ similar aspects as in the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the monitoring occasion configuration 1200 in FIG. 12, the method 1300 in FIG. 13, and/or the method 1400 in FIG. 14. As illustrated, the method 1100 includes a number of enumerated blocks, but aspects of the method 1100 may include additional blocks before, after, and/or in between the enumerated blocks. In some aspects, one or more of the enumerated blocks may be omitted or performed in a different order.

At block 1102, the method 1100 includes monitoring for DCI in at least one of the first set of monitoring occasions 1022 for exclusive full-UL slot scheduling or the second set of monitoring occasions 1024 for exclusive full-duplex slot scheduling. The DCI may include an UL cancellation indication that references a plurality of resources in one or more full-UL slots and one or more full-duplex slots. The UE 115 may monitor for the DCI in the first set of monitoring occasions 1022 and/or the second set of monitoring occasions 1024. For example, the DCI may include a DCI format 2_4, and the UE 115 may monitor the first set of monitoring occasions 1022 and/or the second set of monitoring occasions 1024 for the DCI format 2_4.

At block 1104, the method 1100 includes detecting the DCI in a monitoring occasion (e.g., monitoring occasion 1022a, 1022b, 1022c, or 1022d) of the first set of monitoring occasions 1022 or the second set of monitoring occasions 1024. The UE 115 may detect the DCI.

At block 1106, the method 1100 includes determining whether the monitoring occasion is in the first set of monitoring occasions 1022. The UE 115 may determine whether the monitoring occasion is in the first set of monitoring occasions 1022 for exclusive full-UL slot scheduling. If the monitoring occasion is determined to be in the first set of monitoring occasions 1022, the method 1100 may proceed to block 1108. If the monitoring occasion is determined to be in the second set of monitoring occasions 1024, the method 1100 may proceed to block 1114.

At block 1108, the method 1100 includes applying the UL cancellation indication to the one or more full-UL slots based on a set of parameters. The set of parameters may be used for both full-duplex slots and full-UL slots, unless truncation is used. Truncation is discussed further below. The set of parameters may specify a first number of symbols in the plurality of resources and a second number of symbol groups in the first number of symbols. The UE 115 may determine whether the first number of symbols is within at least one of the one or more full-duplex slots or the one or more full-UL slots. As discussed in more detail below, the UE 115 may apply, based on a set of parameters, the UL cancellation indication to the one or more full-UL slots in response to detecting the DCI in the monitoring occasion of the first set of monitoring occasions 1022 for exclusive full-UL slot scheduling. Additionally, the UE 115 may ignore the UL cancellation indication in relation to applying the UL cancellation indication to the one or more full-duplex slots based on the set of parameters. If the UE 115 ignores the UL cancellation indication for the one or more full-duplex slots, the UE 115 determines not to apply the UL cancellation to the one or more full-duplex slots. For instance, the UE 115 may determine to transmit in a resource of the plurality of resources within the one or more full-duplex slots regardless of whether the bit in the symbol group corresponding to the resource is 0 or 1.

At block 1110, the method 1100 includes refraining, based on applying the UL cancellation indication to the one or more full-UL slots based on the set of parameters, from transmitting a communication in a resource of the plurality of resources within the one or more full-UL slots. The UE 115 may refrain from transmitting a communication in a first resource of the plurality of resources in the one or more full-UL slots in response to a determination that one or more symbols of the first number of symbols is within the one or more full-UL slots and the DCI being detected in the monitoring occasion of the first set of monitoring occasions for exclusive full-UL slot scheduling. If an UL cancellation indication is applied to a resource, the UE may refrain from transmitting an UL communication in the resource.

At block 1112, the method 1100 includes transmitting a communication in the one or more full-duplex slots. The UE 115 may transmit the communication in a second resource of the plurality of resources in the one or more full-duplex slots in response to a determination that one or more symbols of the first number of symbols is within the one or more full-duplex slots and the DCI being detected in the monitoring occasion of the first set of monitoring occasions for exclusive full-UL slot scheduling.

As discussed above, the UE 115 may apply the UL cancellation indication based on a set of parameters specifying a first number of symbols in the plurality of resources and a second number of symbol groups in the first number of symbols. The UL cancellation indication may include a bit sequence (e.g., the bit sequence in the DCI payload 702 in FIG. 7A). In some aspects, one or more symbol groups of the second number of symbol groups may have symbols that are in one or more full-UL slots and one or more full-duplex slots. The UE 115 may determine whether the UL cancellation indication applies to the one or more symbol groups. In some instances, the UE 115 may determine that the UL cancellation indication does not apply to a symbol group including one or more symbols in the one or more in full-duplex slots in response to a determination that one or more symbol groups of the second number of symbol groups is within the one or more full-UL slots and the one or more full-duplex slots and in response to detecting the DCI in the monitoring occasion of the first set of monitoring occasions 1022. In some instances, the UE 115 is not expected to receive an UL cancellation indication with any symbol group including symbols within both a full-UL slot and a full-duplex slot. For instance, the UE 115 may determine that the UL cancellation indication does not apply to a symbol group including one or more symbols in the one or more full-UL slots and the one or more full-duplex slots in response to a determination that one or more symbol groups of the second number of symbol groups is within the one or more full-UL slots and the one or more full-duplex slots and in response to detecting the DCI in the monitoring occasion of the first set of monitoring occasions 1022. The UE 115 may discard the UL cancellation indication and accordingly determine not to apply the UL cancellation indication to any symbol group at all. The UE 115 may refrain from applying the UL cancellation indication in response to a determination that one or more symbol groups of the second number of symbol groups is within the one or more full-UL slots and the one or more full-duplex slots and in response to detecting the DCI in the monitoring occasion of the first set of monitoring occasions 1022. In some instances, the UE 115 may determine that the UL cancellation indication applies to a symbol group including one or more symbols in the one or more full-UL slots and the one or more full-duplex slots in response to a determination that one or more symbol groups of the second number of symbol groups is within the one or more full-UL slots and the one or more full-duplex slots and in response to detecting the DCI in the monitoring occasion of the first set of monitoring occasions 1022.

As discussed above, if the monitoring occasion is determined to be in the second set of monitoring occasions 1024, the method 1100 may proceed to block 1114.

At block 1114, the method 1100 includes applying the UL cancellation indication to the one or more full-duplex slots based on the set of parameters. The set of parameters may be used for both full-duplex slots and full-UL slots, unless truncation is used. The set of parameters may specify a first number of symbols in the plurality of resources and a second number of symbol groups in the first number of symbols. The UE 115 may determine whether the first number of symbols is within at least one of the one or more full-duplex slots or the one or more full-UL slots. As discussed in more detail below, the UE 115 may apply, based on a set of parameters, the UL cancellation indication to the one or more full-duplex slots in response to detecting the DCI in the monitoring occasion of the second set of monitoring occasions 1024 for exclusive full-duplex slot scheduling. Additionally, the UE 115 may ignore the UL cancellation indication in relation to applying the UL cancellation indication to the one or more full-UL slots based on the set of parameters. If the UE 115 ignores the UL cancellation indication for the one or more full-UL slots, the UE 115 determines not to apply the UL cancellation to the one or more full-UL slots. For instance, the UE 115 may determine to transmit in a resource of the plurality of resources within the one or more full-UL slots regardless of whether the bit in the symbol group corresponding to the resource is 0 or 1.

At block 1116, the method 1100 includes refraining, based on applying the UL cancellation indication to the one or more full-duplex slots based on the set of parameters, from transmitting a communication in a resource of the plurality of resources within the one or more full-duplex slots. The UE 115 may refrain from transmitting a communication in a second resource of the plurality of resources in the one or more full-duplex slots in response to a determination that one or more symbols of the first number of symbols is within the one or more full-duplex slots and the DCI being detected in the monitoring occasion of the second set of monitoring occasions for exclusive full-duplex slot scheduling. If an UL cancellation indication is applied to a resource, the UE may refrain from transmitting an UL communication in the resource.

At block 1118, the method 1100 includes transmitting a communication in the one or more full-UL slots. The UE 115 may transmit the communication in a first resource of the plurality of resources in the one or more full-UL slots in response to a determination that one or more symbols of the first number of symbols is within the one or more full-UL slots and the DCI being detected in the monitoring occasion of second first set of monitoring occasions for exclusive full-duplex slot scheduling.

As discussed above, the UE 115 may apply the UL cancellation indication based on a set of parameters specifying a first number of symbols in the plurality of resources and a second number of symbol groups in the first number of symbols. The UL cancellation indication may include a bit sequence (e.g., the bit sequence in the DCI payload 702 in FIG. 7A). In some aspects, one or more symbol groups of the second number of symbol groups may have symbols that are in one or more full-UL slots and one or more full-duplex slots. The UE 115 may determine whether the UL cancellation indication applies to the one or more symbol groups. In some instances, the UE 115 may determine that the UL cancellation indication does not apply to a symbol group including one or more symbols in the one or more in full-UL slots in response to a determination that one or more symbol groups of the second number of symbol groups is within the one or more full-UL slots and the one or more full-duplex slots and in response to detecting the DCI in the monitoring occasion of the second set of monitoring occasions 1024. In some instances, the UE 115 is not expected to receive an UL cancellation indication with any symbol group including symbols within both a full-UL slot and a full-duplex slot. For instance, the UE 115 may determine that the UL cancellation indication does not apply to a symbol group including one or more symbols in the one or more full-UL slots and the one or more full-duplex slots in response to a determination that one or more symbol groups of the second number of symbol groups is within the one or more full-UL slots and the one or more full-duplex slots and in response to detecting the DCI in the monitoring occasion of the second set of monitoring occasions 1024. The UE 115 may discard the UL cancellation indication and accordingly determine not to apply the UL cancellation indication to any symbol group at all. The UE 115 may refrain from applying the UL cancellation indication in response to a determination that one or more symbol groups of the second number of symbol groups is within the one or more full-UL slots and the one or more full-duplex slots and in response to detecting the DCI in the monitoring occasion of the second set of monitoring occasions 1024. In some instances, the UE 115 may determine that the UL cancellation indication applies to a symbol group including one or more symbols in the one or more full-UL slots and the one or more full-duplex slots in response to a determination that one or more symbol groups of the second number of symbol groups is within the one or more full-UL slots and the one or more full-duplex slots and in response to detecting the DCI in the monitoring occasion of the second set of monitoring occasions 1024.

In some aspects, the UE 115 may monitor a single set of monitoring occasions for DCI including a payload that includes the UL cancellation indication. The UL cancellation indication may include a first bit sequence for the one or more full-UL slots and a second bit sequence for the one or more full-duplex slots. The UE 115 may receive a first position value indicating a first position in the DCI referencing the first bit sequence and receive a second position value indicating a second position in the DCI referencing the second bit sequence. Additionally or alternatively, the UE 115 may receive a first size value indicating a first size of the first bit sequence and may receive a second size value indicating a second size of the second bit sequence.

In some aspects, a payload of the DCI 510, 610 may include an UL cancellation indication for the UL carrier (as well as for the SUL if the UE is configured with a SUL). If the UE 115 is configured with a set of full duplex slots, the UE 115 may receive a first bit sequence for the full-UL slots and a second bit sequence for the full-duplex slots. The DCI 510, 610 may include the first and second bit sequences. The positionInDCI may be separately provided to the UE 115 for the full-UL slots and the full-duplex slots. Additionally or alternatively, the BS 105 may configure the size of the DCI payload (e.g., value of the CI-PayloadSize) separately or jointly for the full-UL slots and the full-duplex slots. The first bit sequence may have a first CI-PayloadSize, and the second bit sequence may have a second CI-PayloadSize. For example, the first CI-PayloadSize for the full-UL slots may be the same as the second CI-PayloadSize for the full-duplex slots. In another example, the first CI-PayloadSize for the full-UL slots may be different from the second CI-PayloadSize for the full-duplex slots.

FIG. 12 illustrates a monitoring occasion configuration 1200 associated with full-duplex slots and full-UL slots according to one or more aspects of the present disclosure. The BS 105 and the UE 115 may communicate in accordance with the monitoring occasion configuration 1200. The x-axis represents time in some arbitrary units, and the y-axis represents frequency resource in some arbitrary units.

In the example illustrated in FIG. 12, the BS 105 may configure a set of monitoring occasions 1204 associated with full-duplex slots and full-UL slots for the UE 115 to monitor for DCI including an UL cancellation indication. The set of monitoring occasions 1024 may be for full-UL slot scheduling and full-duplex slot scheduling. For example, if the BS 105 desires to reschedule another UE in a full-UL slot and/or a full-duplex slot in the set of monitoring occasions 1204, the BS 105 may determine the DCI_2_4 and in which monitoring occasion of the set of monitoring occasions 1204 to send the DCI. The set of monitoring occasions 1204 includes a monitoring occasion 1204a, a monitoring occasion 1204b, a monitoring occasion 1204c, and a monitoring occasion 1204d. The set of monitoring occasions 1204 may include fewer or more than the four monitoring occasions shown in FIG. 12. As an example, the BS 105 may determine to send the DCI 2_4 (shown as 1210) during the monitoring occasion 1204d.

Figure 13:
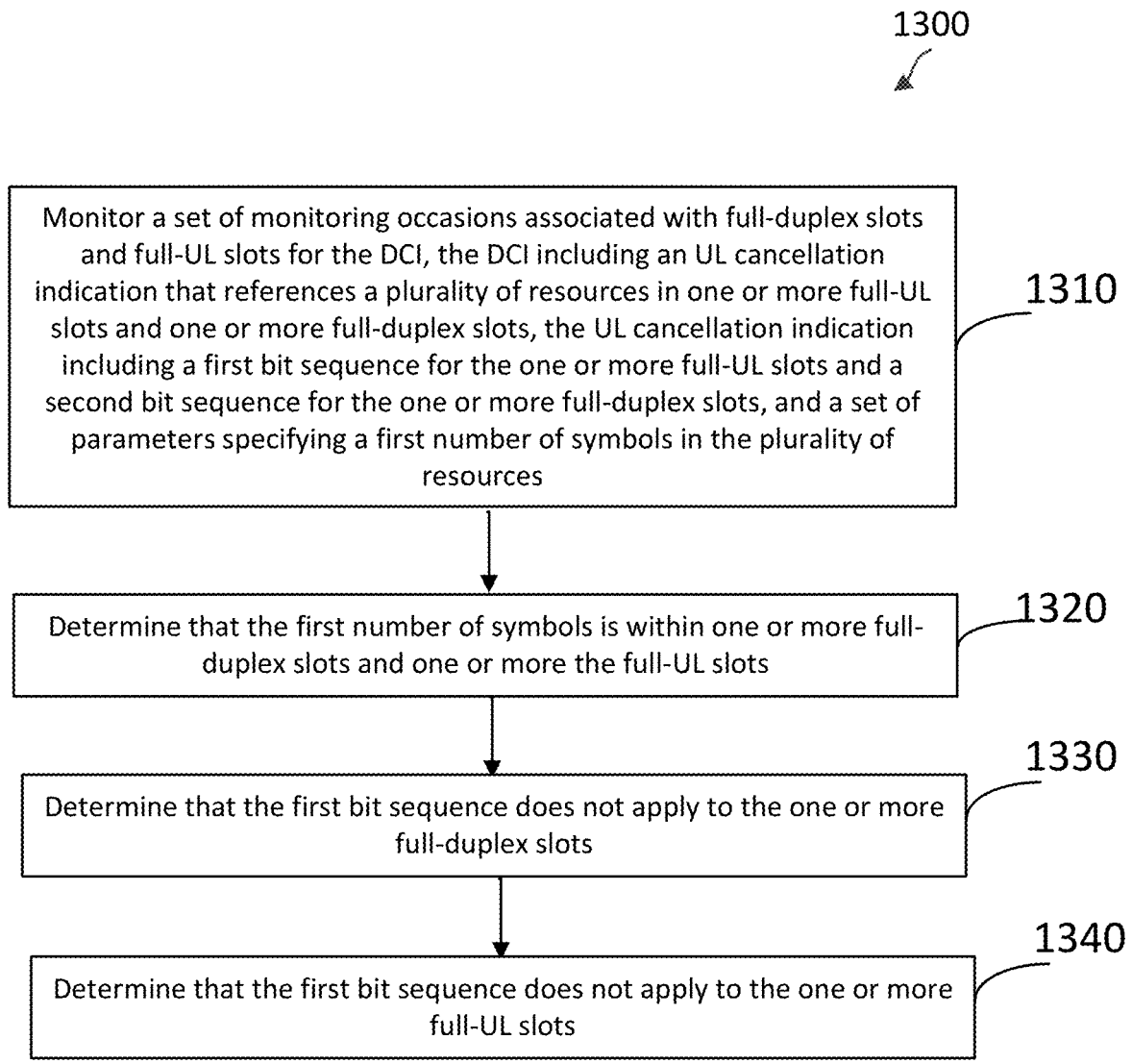
FIG. 13 illustrates a flow diagram of a method of applying an UL cancellation indication based on detecting DCI in a monitoring occasion configuration associated with full-duplex slots and full-UL slots according to one or more aspects of the present disclosure.

FIG. 12 will be discussed relative to FIG. 13 (and vice versa) to better understand concepts related to applying the UL cancellation indication to the full-UL slots and/or the full-duplex slots in relation to the set of monitoring occasions 1204. FIG. 13 illustrates a flow diagram of a method 1300 of applying the UL cancellation indication based on detecting the DCI in a monitoring occasion of the set of monitoring occasions 1204 according to one or more aspects of the present disclosure. Blocks of the method 1300 can be executed by a computing device (e.g., a processor, processing circuit, and/or other suitable component) of a wireless communication device. In some aspects, the wireless communication device is a UE (e.g., UEs 115 and/or UE 900) that may utilize one or more components, such as the processor 902, the memory 904, the configured grant module 908, the UL cancellation indication module 909, the transceiver 910, and/or the antennas 916 to execute the blocks of the method 1300. The method 1300 may employ similar aspects as in the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, and/or the method 1400 in FIG. 14. As illustrated, the method 1300 includes a number of enumerated blocks, but aspects of the method 1300 may include additional blocks before, after, and/or in between the enumerated blocks. In some aspects, one or more of the enumerated blocks may be omitted or performed in a different order.

At block 1310, the method 1300 includes monitoring a set of monitoring occasions 1204 associated with full-duplex slots and full-UL slots for the DCI, the DCI including an UL cancellation indication that references a plurality of resources in one or more full-UL slots and one or more full-duplex slots, the UL cancellation indication including a first bit sequence for the one or more full-UL slots and a second bit sequence for the one or more full-duplex slots, and a set of parameters specifying a first number of symbols in the plurality of resources. The UE 115 may monitor for the DCI in the set of monitoring occasions 1204. For example, the DCI may include a DCI format 2_4, and the UE 115 may monitor the set of monitoring occasions 1204 for the DCI format 2_4.

At block 1320, the method 1300 includes determining that the first number of symbols is within one or more full-duplex slots and one or more full-UL slots. The UE 115 may determine that the first number of symbols is within one or more full-duplex slots and one or more full-UL slots.

At block 1330, the method 1300 includes determining that the first bit sequence does not apply to the one or more full-duplex slots. The UE 115 may determine that the first bit sequence does not apply to the one or more full-duplex slots in response to a determination that the first number of symbols is within one or more full-duplex slots and one or more the full-UL slots.

At block 1340, the method 1300 includes determining that the second bit sequence does not apply to the one or more full-UL slots. The UE 115 may determine that the second bit sequence does not apply to the one or more full-UL slots in response to a determination that the first number of symbols is within one or more full-duplex slots and one or more the full-UL slots Accordingly, if different bit sequences are used for the full-duplex slots and the full-UL slots and the timespan of the resources of the plurality of resources overlaps with both full-duplex and full-UL slots, the UE 115 may ignore the portion of the UL cancellation indication that collides with symbol groups of a different slot type. If the UE 115 ignores a portion of the UL cancellation indication (e.g., ignore the first bit sequence or the second bit sequence), the UE 115 may form a time-frequency grid (e.g., the time-frequency grid including the first group of RBs 732a and the second group of RBs 732b in FIG. 7A) in a variety of ways. In some instances, the UE 115 may form the time-frequency grid based on the set of parameters specifying a first number of symbols in the plurality of resources and a second number of symbol groups in the first number of symbols. For instance, the UE 115 may form an initial time-frequency grid by determining a timespan of the first number of symbols and partitioning the first number of symbols into a second number of symbol groups in the first number of symbols. For example, if T_CI is 28 symbols and G_CI is 7 symbol groups, the time-frequency grid may have 7 symbol groups, with each symbol group including 4 symbols.

In some instances, the UE 115 may form the time-frequency grid by truncating the initial time-frequency grid (e.g., the time-frequency grid shown in FIG. 7B), potentially providing a better indication granularity in time and frequency. In some examples, for the first bit sequence for the one or more full-UL slots, the UE 115 may truncate the initial time-frequency grid by removing the symbols that are in the full-duplex slots from the T_CI and then forming the time-frequency grid. Accordingly, the formed time-frequency grid may be devoid of symbols that are in the full-duplex slots. In some examples, for the second bit sequence for the one or more full-duplex slots, the UE 115 may truncate the initial time-frequency grid by removing the symbols that are in the full-UL slots from the T_CI and then forming the time-frequency grid. Accordingly, the formed time-frequency grid may be devoid of symbols that are in the full-UL slots.

In some instances, the UE 115 may form the time-frequency grid by removing the symbols of other types and then counting the remaining number of symbols in the plurality of resources. For example, in some instances the UE can determine the number of symbols that will be counted in the time-frequency grid to determine a final granularity of the grid before calculating the time-frequency grid. The UE can remove the symbols of other types (e.g., removing full-duplex symbols in a full-UL slot, removing full-UL symbols in a full-duplex slot, etc.) and divide the remaining symbols into G_CI groups. In some instances, this approach can improve the granularity of the time-frequency grid.

In some aspects, the UL cancellation indication is considered for an UL carrier and includes a bit sequence for one or more full-UL slots and one or more full-duplex slots. The UE 115 may apply the UL cancellation indication to all symbol groups regardless of the type of symbols in each symbol group. For example, the UE 115 may apply the bit sequence to the set of parameters for the one or more full-UL slots and the one or more full-duplex slots.

In some instances, if the BS 105 configures a single set of frequency resources for the UL cancellation indication, the set of parameters may specify a number of contiguous RBs of the plurality of resources that is referenced by the UL cancellation indication. If the BS 105 configures the single set of frequency resources for the UL cancellation indication, then in one or more full-duplex slots, one or more groups of RBs of the number of contiguous RBs may be in an UL RB (e.g., in an UL band in a full-duplex slot) and in a DL RB (e.g., in a DL band in the full-duplex slot). The UE 115 may determine whether one or more groups of RBs include an UL RB and a DL RB, when the one or more groups of RBs are in one or more full-duplex slots. The UE 115 may apply the bit sequence to the one or more groups of RBs including an UL RB and a DL RB in response to a determination that the one or more groups of RBs are in an UL RB and a DL RB in one or more full-duplex slots. Alternatively, the UE 115 may ignore the one or more groups of RBs that include an UL band and a DL band, when the one or more groups of RBs are in one or more full-duplex slots.

In some instances, if the BS 105 configures different sets of frequency resources for the UL cancellation indication, then the set of parameters may include a first set of frequency parameters for the full-UL slots and a second set of frequency parameters for the full-duplex slots. The set of parameters may specify a first number of contiguous RBs of the plurality of resources that is referenced by the UL cancellation indication. The first set of frequency parameters may specify a second number of RBs from the first number of contiguous RBs, and the second set of frequency parameters may specify a third number of RBs from the first number of contiguous RBs. For each full-UL slots and full-duplex slots, the UE 115 may determine a group of RBs in the respective slot based on the parameters configured for that slot type. For instance, for each full-UL slot, the UE 115 may determine a group of RBs of the second number of RBs, where the group of RBs is based on the first set of frequency parameters. Additionally or alternatively, for each full-duplex slot, the UE 115 may determine a group of RBs of the third number of RBs, where the group of RBs is based on the second set of frequency parameters. Accordingly, the number of RBs may be different in the full-UL slots and the full-duplex slots.

In some aspects, the BS 105 may configure the UE 115 with a first timespan (e.g., a first T_CI) for the full-UL slots and a second timespan (e.g., a second T_CI) for the full-duplex slots. For example, the set of parameters may specify a first number of symbols in the plurality of resources for the full-UL slots and specify a second number of symbols in the plurality of resources for the full-duplex slots. In some instances, if all symbols within the first timespan (e.g., within the first T_CI range) are in the one or more full-UL slots, the UE 115 may use the first timespan that is configured for the full-UL slots in the calculation of the time-frequency grid. For example, the UE 115 may determine that all the first number of symbols are within the one or more full-UL slots and accordingly apply the one or more bits in the bit sequence in the UL cancellation indication to the first number of symbols. In some instances, if all symbols within the second timespan (e.g., within the second T_CI range) are in the one or more full-duplex slots, the UE 115 may use the second timespan that is configured for the full-duplex slots in the calculation of the time-frequency grid. For example, the UE 115 may determine that all the second number of symbols are within the one or more full-duplex slots and accordingly apply the one or more bits in the bit sequence in the UL cancellation indication to the second number of symbols.

In some aspects, the UE 115 may determine which parameters to use for the full-UL slots and/or the full-duplex slots based on where the UE 115 receives the DCI. For example, the UE 115 may receive the DCI in a full-DL slot (e.g., DL slot 504a in FIG. 5 or FIG. 6) or in full-duplex slot (e.g., full-duplex slot 504b in FIG. 5 or FIG. 6). The UE 115 may apply, based on whether the DCI is received in the first full-DL slot or the first full-duplex slot, the UL cancellation indication to one or more full-UL slots or to one or more full-duplex slots. In some instances, if the UE 115 receives the DCI including the UL cancellation indication in a full-DL slot, the UE 115 may apply the UL cancellation indication to the one or more full-UL slots based on the set of parameters. In some instances, if the UE 115 receives the DCI including the UL cancellation indication in a full-duplex slot, the UE 115 may apply the UL cancellation indication to the one or more full-duplex slots based on the set of parameters.

Figure 14:
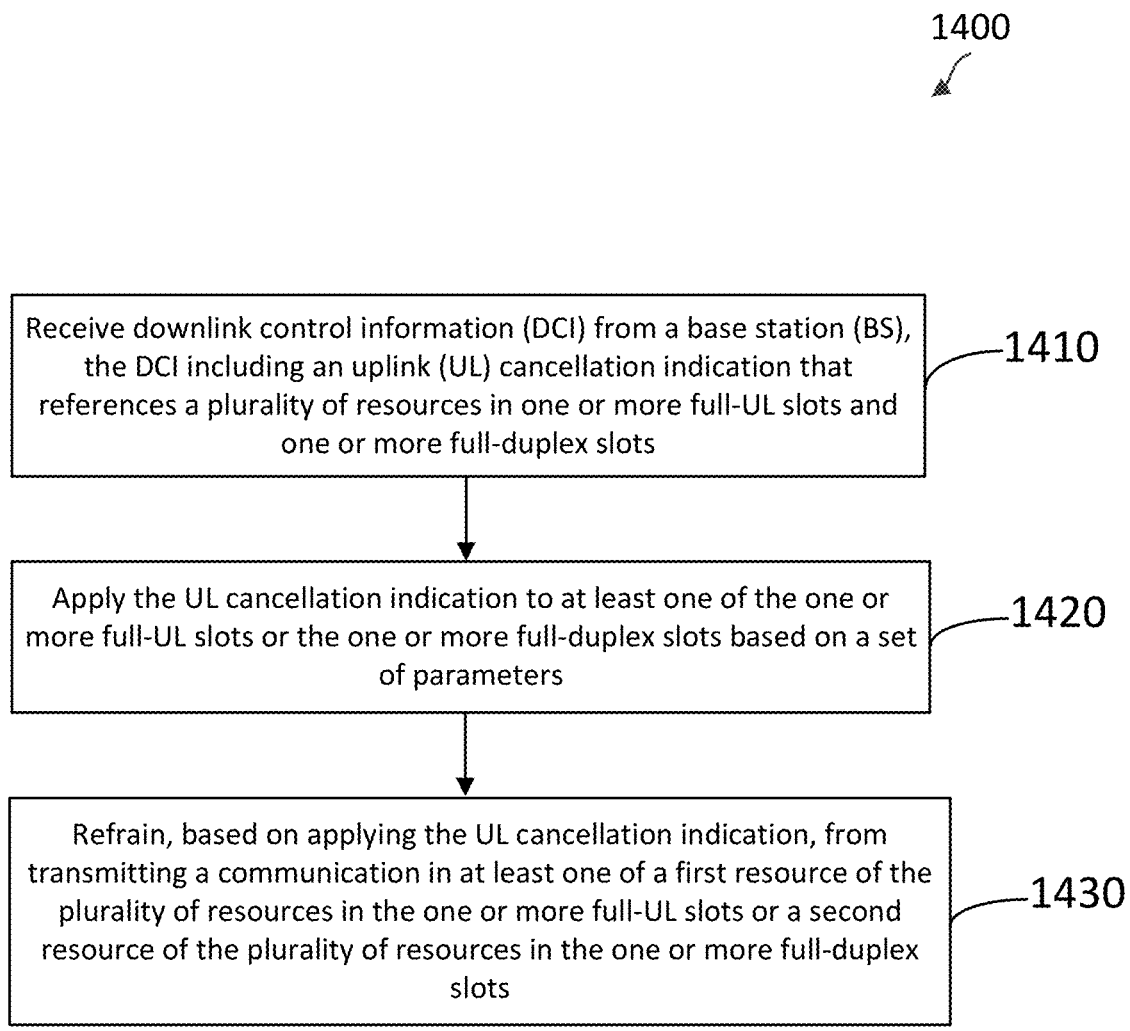
FIG. 14 illustrates a flow diagram of a wireless communication method for cancelling, based on applying an UL cancellation indication, transmission of an UL communication in a resource according to one or more aspects of the present disclosure.

FIG. 14 illustrates a flow diagram of a communication method 1400 for cancelling, based on applying an UL cancellation indication, transmission of an UL communication in a resource according to one or more aspects of the present disclosure. Blocks of the method 1400 can be executed by a computing device (e.g., a processor, processing circuit, and/or other suitable component) of a wireless communication device. In some aspects, the wireless communication device is a UE (e.g., UEs 115 and/or UE 900) that may utilize one or more components, such as the processor 902, the memory 904, the configured grant module 908, the UL cancellation indication module 909, the transceiver 910, and/or the antennas 916 to execute the blocks of the method 1400. The method 1400 may employ similar aspects as in the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, and/or the method 1300 in FIG. 13. As illustrated, the method 1400 includes a number of enumerated blocks, but aspects of the method 1400 may include additional blocks before, after, and/or in between the enumerated blocks. In some aspects, one or more of the enumerated blocks may be omitted or performed in a different order.

At block 1410, the method 1400 includes receiving DCI from a BS, the DCI including an UL cancellation indication that references a plurality of resources in one or more full-UL slots and one or more full-duplex slots.

At block 1420, the method 1400 includes applying the UL cancellation indication to at least one of the one or more full-UL slots or the one or more full-duplex slots based on a set of parameters.

At block 1430, the method 1400 includes refraining, based on applying the UL cancellation indication, from transmitting a communication in at least one of a first resource of the plurality of resources in the one or more full-UL slots or a second resource of the plurality of resources in the one or more full-duplex slots.

In some instances, the set of parameters can include a timespan of the plurality of resources. In some aspects, the method 1400 can include determining that the timespan is in the one or more full-UL slots, applying the UL cancellation indication to the timespan for the one or more full-UL slots, and refraining from transmitting the communication in the first resource of the plurality of resources. In some aspects, the method 1400 can include determining that the timespan is in the one or more full-duplex slots, applying the UL cancellation indication to the timespan for the one or more full-duplex slots, and refraining from transmitting the communication in the second resource of the plurality of resources.

In some instances, the method 1400 includes monitoring for the DCI in at least one of a first set of monitoring occasions for exclusive full-UL slot scheduling or a second set of monitoring occasions for exclusive full-duplex slot scheduling. In some aspects, the method 1400 includes detecting the DCI in a monitoring occasion of the first set of monitoring occasions for exclusive full-UL slot scheduling, the DCI including the UL cancellation indication, and the set of parameters specifying a first number of symbols in the plurality of resources and a second number of symbol groups in the first number of symbols, applying the UL cancellation indication to one or more full-UL slots based on the set of parameters in response to detecting the DCI in the monitoring occasion of the first set of monitoring occasions for exclusive full-UL slot scheduling; determining whether the first number of symbols is within at least one of the one or more full-duplex slots or the one or more full-UL slots, and refraining from transmitting the communication in the first resource in response to a determination that one or more symbols of the first number of symbols is within the one or more full-UL slots and the DCI being detected in the monitoring occasion of the first set of monitoring occasions for exclusive full-UL slot scheduling. In some aspects, the method 1400 includes transmitting a second communication in the second resource in response to a determination that one or more symbols of the first number of symbols is within the one or more full-duplex slots and the DCI being detected in the monitoring occasion of the first set of monitoring occasions for exclusive full-UL slot scheduling.

In some instances, the method 1400 includes determining that one or more symbol groups of the second number of symbol groups is within the one or more full-UL slots and the one or more full-duplex slots. In some aspects, the UL cancellation indication includes a bit sequence. In some aspects, the method 1400 includes determining that the UL cancellation indication does not apply to a symbol group including one or more symbols in the one or more in full-duplex slots in response to a determination that one or more symbol groups of the second number of symbol groups is within the one or more full-UL slots and the one or more full-duplex slots. In some aspects, the method 1400 includes determining that the UL cancellation indication does not apply to a symbol group including one or more symbols in the one or more full-UL slots and the one or more full-duplex slots in response to a determination that one or more symbol groups of the second number of symbol groups is within the one or more full-UL slots and the one or more full-duplex slots. In some aspects, the method 1400 includes determining that the UL cancellation indication applies to a symbol group including one or more symbols in the one or more full-UL slots and the one or more full-duplex slots in response to a determination that one or more symbol groups of the second number of symbol groups is within the one or more full-UL slots and the one or more full-duplex slots.

In some instances, the method 1400 includes detecting the DCI in a monitoring occasion of the second set of monitoring occasions for exclusive full-duplex slot scheduling, the DCI including the UL cancellation indication, and the set of parameters specifying a first number of symbols in the plurality of resources and a second number of symbol groups in the first number of symbols, applying the UL cancellation indication to the one or more full-duplex slots in response to detecting the DCI in the monitoring occasion of the second set of monitoring occasions for exclusive full-duplex slot scheduling; determining whether the first number of symbols is within at least one of the one or more full-duplex slots or the one or more full-UL slots, and refraining from transmitting the communication in the second resource in response to a determination that one or more symbols of the first number of symbols is within the one or more full-duplex slots and the DCI being detected in the monitoring occasion of the second set of monitoring occasions for exclusive full-duplex slot scheduling. In some aspects, the method 1400 includes transmitting a second communication in the first resource in response to a determination that one or more symbols of the first number of symbols is within the one or more full-UL slots and the DCI being detected in the monitoring occasion of the second set of monitoring occasions for exclusive full-duplex slot scheduling. In some aspects, the method 1400 includes determining that one or more symbol groups of the second number of symbol groups is within the one or more full-UL slots and the one or more full-duplex slots.

In some instances, the UL cancellation indication includes a bit sequence and the method 1400 includes determining that the UL cancellation indication does not apply to a symbol group including one or more symbols in the one or more in full-UL slots in response to a determination that one or more symbol groups of the second number of symbol groups is within the one or more full-UL slots and the one or more full-duplex slots.

In some instances, the UL cancellation indication includes a bit sequence and the method 1400 includes determining that the UL cancellation indication does not apply to a symbol group including one or more symbols in the one or more full-UL slots and the one or more full-duplex slots in response to a determination that one or more symbol groups of the second number of symbol groups is within the one or more full-UL slots and the one or more full-duplex slots.

In some instances, the UL cancellation indication includes a bit sequence and the method 1400 includes determining that the UL cancellation indication applies to a symbol group including one or more symbols in the one or more full-UL slots and the one or more full-duplex slots in response to a determination that one or more symbol groups of the second number of symbol groups is within the one or more full-UL slots and the one or more full-duplex slots.

In some instances, the method 1400 includes monitoring a set of monitoring occasions associated with full-duplex slots and full-UL slots for the DCI, the set of parameters specifying a first number of symbols in the plurality of resources; and determining that the first number of symbols is within one or more full-duplex slots and one or more the full-UL slots. In some aspects, the UL cancellation indication includes a first bit sequence for the one or more full-UL slots and a second first bit sequence for the one or more full-duplex slots and the method 1400 can include, in response to a determination that the first number of symbols is within one or more full-duplex slots and one or more the full-UL slots, determining that the first bit sequence does not apply to the one or more full-duplex slots; and determining that the second bit sequence does not apply to the one or more full-UL slots.

In some instances, the UL cancellation indication includes a bit sequence for the one or more full-UL slots and the one or more full-duplex slots. In some aspects, the method 1400 includes applying the bit sequence to the one or more full-UL slots and the one or more full-duplex slots. In some aspects, the set of parameters specifies a number of contiguous RBs of the plurality of resources and the method 1400 includes determining that a group of RBs of the number of contiguous RBs includes an UL RB and a DL RB in one or more full-duplex slots, wherein the applying includes applying the bit sequence to the group of RBs. In some aspects, the set of parameters includes a first set of frequency parameters for full-UL slots and a second set of frequency parameters for full-duplex slots. An RB group in a full-UL slot can be based on the first set of frequency parameters and an RB group in a full-duplex slot can be based on the second set of frequency parameters. In some aspects, the set of parameters specifies a first number of symbols in the plurality of resources for the full-UL slots and specifies a second number of symbols in the plurality of resources for the full-duplex slots. In some aspects, the method 1400 includes determining that all the first number of symbols are within the one or more full-UL slots and applying one or more bits in the bit sequence to the first number of symbols. In some aspects, the method 1400 includes determining that all the second number of symbols are within full-duplex slots and applying one or more bits in the bit sequence to the second number of symbols.

In some instances, receiving the DCI includes receiving the DCI in a first full-downlink (DL) slot or a first full-duplex slot, and applying the UL cancellation indication is based on whether the DCI is received in the first full-DL slot or the first full-duplex slot. In some aspects, the DCI in is received in the first full-DL slot and applying the UL cancellation indication includes applying the UL cancellation indication to the one or more full-UL slots. In some aspects, the DCI is received in the first full-duplex slot and applying the UL cancellation indication includes applying the UL cancellation indication to the one or more full-duplex slots.

In some aspects, the UE may receive DCI from a BS, the DCI including an UL cancellation indication that references a plurality of resources in one or more full-UL slots and one or more full-duplex slots as discussed at block 1410. The UE may refrain, based on the UL cancellation indication, from transmitting a communication in at least one of a first resource of the plurality of resources in the one or more full-UL slots or a second resource of the plurality of resources in the one or more full-duplex slots. In some aspects, the UL cancellation indication may indicate a resource cancellation configuration and the UE may determine which time and/or resource(s) in the plurality of resources to cancel or refrain from the transmission based on the UL cancellation indication. In some aspects, the UL cancellation indication may be associated with a set of parameters, which may include frequency parameters (e.g., a number of contiguous RBs of the plurality of resources and/or, and/or one or more RB groups) and/or time parameters (e.g., a timespan of the plurality of resources, a first number of symbols in the plurality of resources, and/or a second number of symbol groups in the first number of symbols), for example, as discussed above in relation to FIGS. 7A-7B. The UE may determine which resource(s) in the plurality of resources to cancel or refrain from the transmission based on the UL cancellation indication and the set of parameters.

Figure 15:
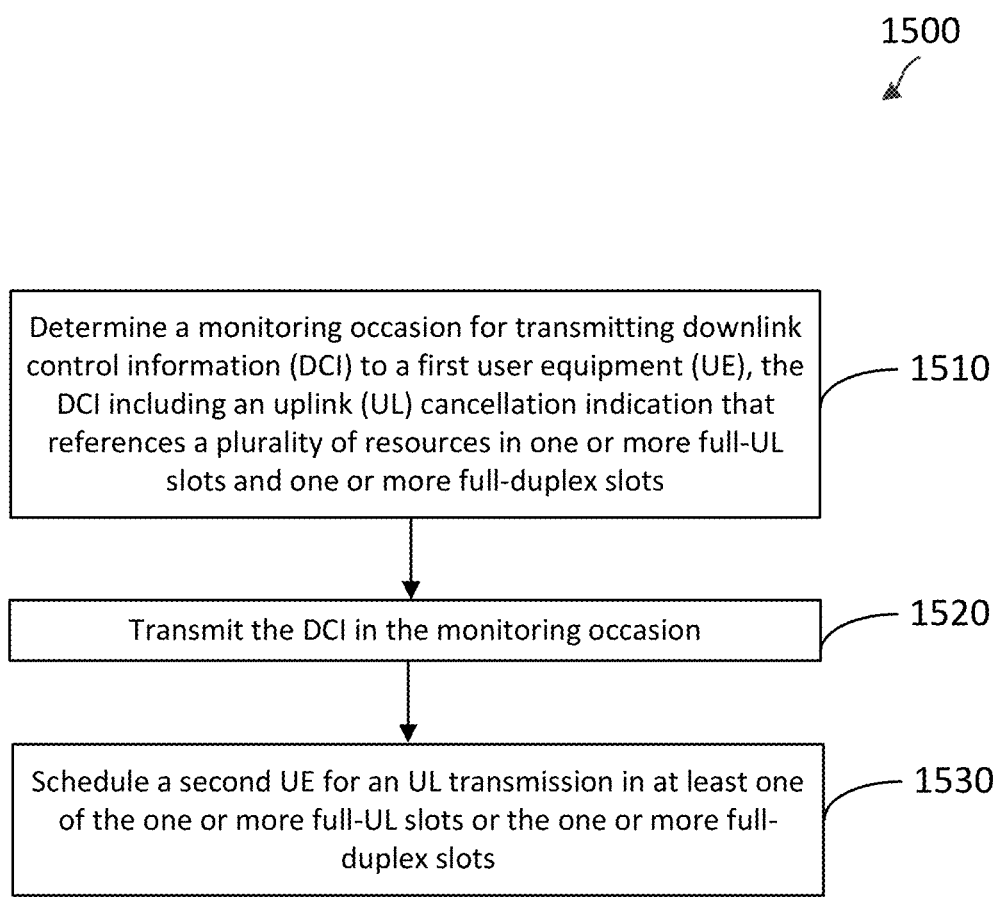
FIG. 15 illustrates a flow diagram of a wireless communication method for cancelling, based on applying an UL cancellation indication, transmission of an UL communication in a resource according to one or more aspects of the present disclosure.

FIG. 15 illustrates a flow diagram of a communication method 1500 for cancelling, based on applying an UL cancellation indication, transmission of an UL communication in a resource according to one or more aspects of the present disclosure. Blocks of the method 1500 can be executed by a computing device (e.g., a processor, processing circuit, and/or other suitable component) of a wireless communication device. In some aspects, the wireless communication device is a BS (e.g., BSs 105 and/or BS 800) that may utilize one or more components, such as the processor 802, the memory 804, the configured grant module 808, the UL cancellation indication module 809, the transceiver 810, and/or the antennas 816 to execute the blocks of the method 1500. The method 1500 may employ similar aspects as in the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, and/or the monitoring occasion configuration 1200 in FIG. 12. As illustrated, the method 1500 includes a number of enumerated blocks, but aspects of the method 1500 may include additional blocks before, after, and/or in between the enumerated blocks. In some aspects, one or more of the enumerated blocks may be omitted or performed in a different order.

At block 1510, the method 1500 includes determining a monitoring occasion for transmitting DCI to a first UE, the DCI including an UL cancellation indication that references a plurality of resources in one or more full-UL slots and one or more full-duplex slots.

At block 1520, the method 1500 includes transmitting the DCI in the monitoring occasion.

At block 1320, the method 1500 includes scheduling a second UE for an UL transmission in at least one of the one or more full-UL slots or the one or more full-duplex slots.

In some instances, the method 1500 includes configuring a first set of monitoring occasions for exclusive full-UL slot scheduling and configuring a second set of monitoring occasions for exclusive full-duplex slot scheduling, wherein the monitoring occasion is of the first set of monitoring occasions or the second set of monitoring occasions. In some aspects, scheduling the second UE includes scheduling the second UE for an UL transmission in one or more full-UL slots if the DCI is transmitted in the monitoring occasion of the first set of monitoring occasions. In some aspects, scheduling the second UE includes scheduling the second UE for an UL transmission in one or more full-duplex slots if the DCI is transmitted in the monitoring occasion of the second set of monitoring occasions.

In some instances, the method 1500 includes configuring a set of monitoring occasions for full-UL slot scheduling and full-duplex slot scheduling, wherein the monitoring occasion is of the set of monitoring occasions, and the DCI includes a first bit sequence for the one or more full-UL slots and a second bit sequence for the one or more full-duplex slots.

In some instances, a user equipment (UE) includes a transceiver configured to receive downlink control information (DCI) from a base station (BS), the DCI including an uplink (UL) cancellation indication that references a plurality of resources in one or more full-UL slots and one or more full-duplex slots and a processor in communication with the transceiver, the processor configured to apply the UL cancellation indication to at least one of the one or more full-UL slots or the one or more full-duplex slots based on a set of parameters; and refrain, based on applying the UL cancellation indication, from transmitting a communication in at least one of a first resource of the plurality of resources in the one or more full-UL slots or a second resource of the plurality of resources in the one or more full-duplex slots. The UE, including the transceiver, processor, and/or other components, may be further configured to perform aspects of the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1400 in FIG. 14.

In some instances, a base station (BS) includes a processor configured to determine a monitoring occasion for transmitting downlink control information (DCI) to a first user equipment (UE), the DCI including an uplink (UL) cancellation indication that references a plurality of resources in one or more full-UL slots and one or more full-duplex slots; and schedule a second UE for an UL transmission in at least one of the one or more full-UL slots or the one or more full-duplex slots; and a transceiver in communication with the processor, the transceiver configured to: transmit the DCI in the monitoring occasion. The BS, including the transceiver, processor, and/or other components, may be further configured to perform aspects of the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1500 in FIG. 15.

In some instances, a user equipment (UE) includes means for receiving downlink control information (DCI) from a base station (BS), the DCI including an uplink (UL) cancellation indication that references a plurality of resources in one or more full-UL slots and one or more full-duplex slots; means for applying the UL cancellation indication to at least one of the one or more full-UL slots or the one or more full-duplex slots based on a set of parameters; and means for refraining, based on applying the UL cancellation indication, from transmitting a communication in at least one of a first resource of the plurality of resources in the one or more full-UL slots or a second resource of the plurality of resources in the one or more full-duplex slots. The UE may include means for performing aspects of the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1400 in FIG. 14.

In some instances, a base station (BS) includes means for determining a monitoring occasion for transmitting downlink control information (DCI) to a first user equipment (UE), the DCI including an uplink (UL) cancellation indication that references a plurality of resources in one or more full-UL slots and one or more full-duplex slots; means for transmitting the DCI in the monitoring occasion; and means for scheduling a second UE for an UL transmission in at least one of the one or more full-UL slots or the one or more full-duplex slots. The BS may include means for performing aspects of the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1500 in FIG. 15.

In some instances, a non-transitory computer-readable medium having program code recorded thereon for wireless communication by a user equipment (UE) is provided. The program code can include code for causing the UE to receive downlink control information (DCI) from a base station (BS), the DCI including an uplink (UL) cancellation indication that references a plurality of resources in one or more full-UL slots and one or more full-duplex slots; code for causing the UE to apply the UL cancellation indication to at least one of the one or more full-UL slots or the one or more full-duplex slots based on a set of parameters; and code for causing the UE to refrain, based on applying the UL cancellation indication, from transmitting a communication in at least one of a first resource of the plurality of resources in the one or more full-UL slots or a second resource of the plurality of resources in the one or more full-duplex slots. The program code may include code for causing the UE to perform aspects of the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1400 in FIG. 14.

In some instances, a non-transitory computer-readable medium having program code recorded thereon for wireless communication by a base station (BS) is provided. The program code can include code for causing the BS to determine a monitoring occasion for transmitting downlink control information (DCI) to a first user equipment (UE), the DCI including an uplink (UL) cancellation indication that references a plurality of resources in one or more full-UL slots and one or more full-duplex slots; code for causing the BS to transmit the DCI in the monitoring occasion; and code for causing the BS to schedule a second UE for an UL transmission in at least one of the one or more full-UL slots or the one or more full-duplex slots. The program code may include code for causing the BS to perform aspects of the method 400 in FIG. 4, the method 500 in FIG. 5, the method 600 in FIG. 6, the method 700 in FIG. 7A, the method 760 in FIG. 7B, the monitoring occasion configuration 1000 in FIG. 10, the method 1100 in FIG. 11, the monitoring occasion configuration 1200 in FIG. 12, the method 1300 in FIG. 13, and/or the method 1500 in FIG. 15.

Figure 16:
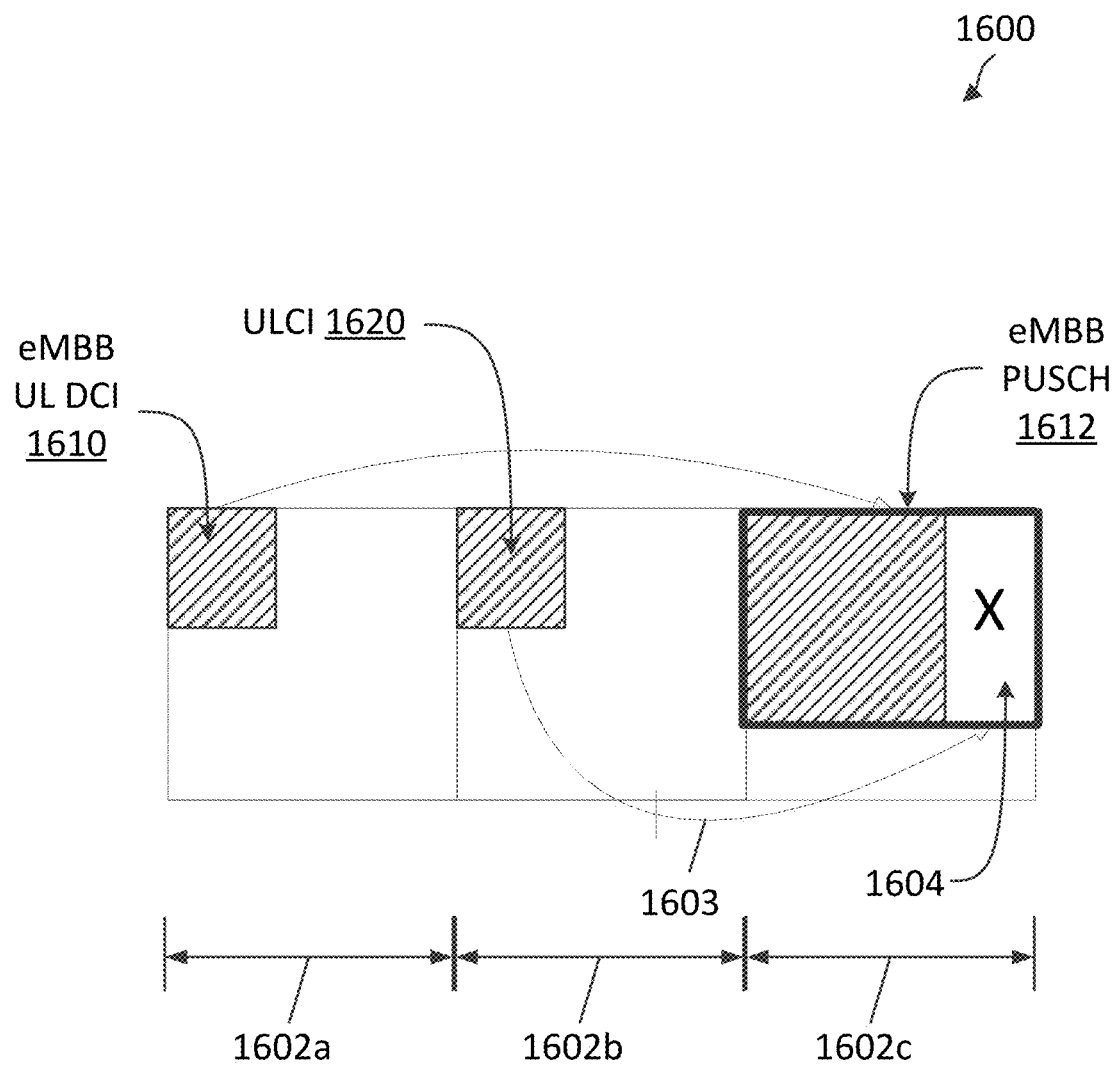
FIG. 16 illustrates a timeline for a resource cancellation scenario according to one or more aspects of the present disclosure.

FIG. 16 illustrates a timeline for resource cancellation scenario 1600 according to one or more aspects of the present disclosure. The scenario 1600 may correspond to a resource cancellation scenario in the network 100. In the scenario 1600, a BS 105 may communicate a resource cancellation with a UE 115 using similar mechanisms as discussed above with respect to FIGS. 4-6, 7A-7B, 9-15. For instance, the BS 105 may transmit an eMBB UL DCI 1610 to the UE 115 during a slot 1602a (e.g., slot 202 of FIG. 2). The eMBB UL DCI 1610 may be a scheduling grant scheduling an eMBB PUSCH transmission 1612 in the slot 1602c. After transmitting the eMBB UL DCI 1610, the BS 105 may transmit an uplink cancellation indicator (ULCI) 1620 during the slot 1602b prior to the slot 1602c. The ULCI 1620 may be DCI format 2_4 message. The ULCI 1620 may be similar to the DCI 1210. The ULCI 1620 may indicate a cancellation for a resource 1604 within the slot 1602c as shown by the arrow 1603. The resource 1604 may be part of the resource scheduled for the eMBB PUSCH transmission 1612. Accordingly, in response to the eMBB UL DCI 1610, the UE 115 may transmit the eMBB PUSCH transmission 1612 according to the eMBB UL DCI 1610 during the slot 1602c. In response to the ULCI 1620, the UE 115 may refrain from transmitting in the cancelled resource 1604 as shown by the empty-filled box with a "X" mark.

Figure 17:
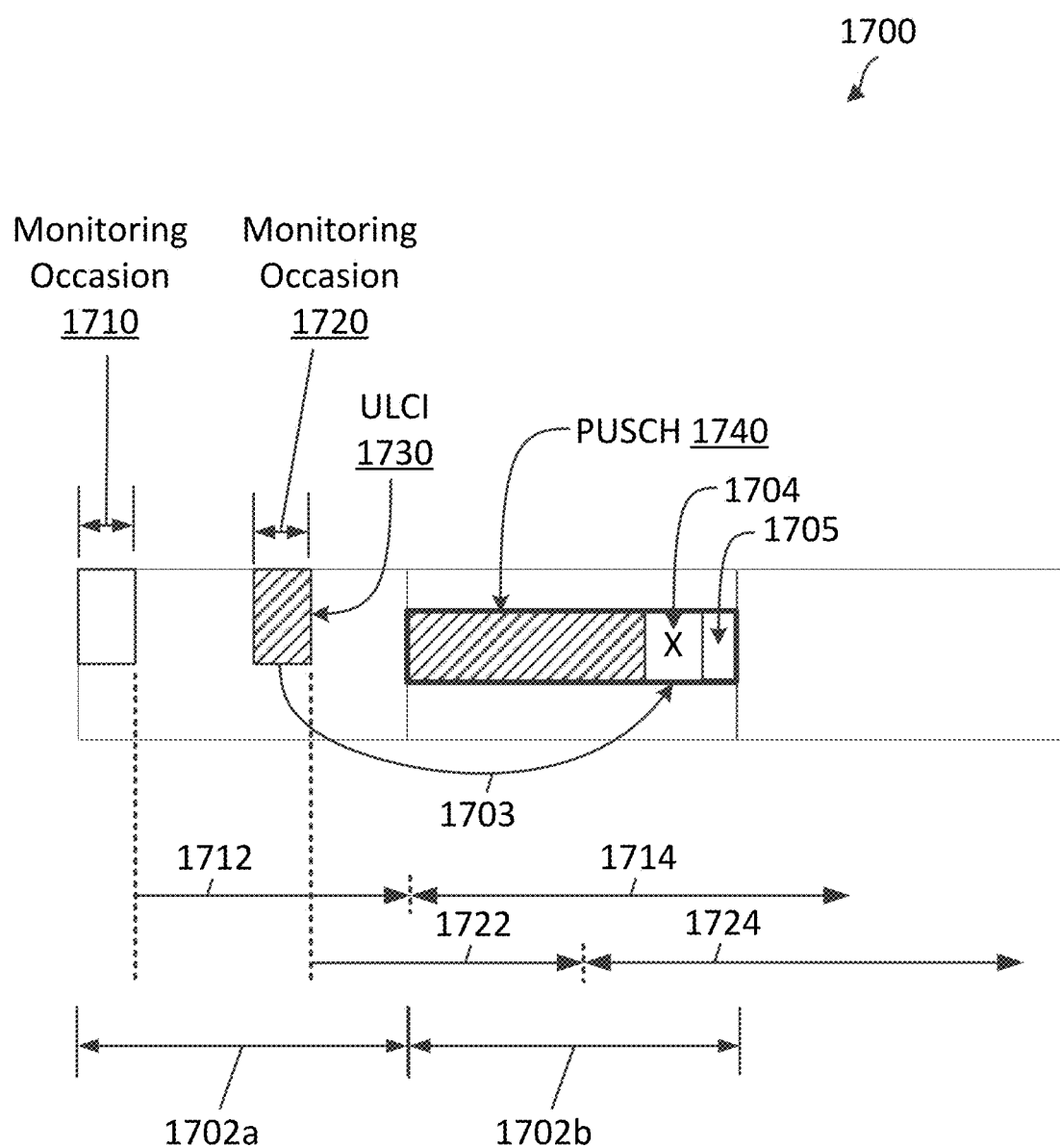
FIG. 17 illustrates a timeline for a resource cancellation scenario according to one or more aspects of the present disclosure.

FIG. 17 illustrates a timeline for a resource cancellation scenario 1700 according to one or more aspects of the present disclosure. The scenario 1700 may correspond to a resource cancellation scenario in the network 100. In the scenario 1700, a BS 105 may communicate a resource cancellation with a UE 115 using similar mechanisms as discussed above with respect to FIGS. 4-6, 7A-7B, 9-15. The BS 105 may configure the UE 115 with a plurality of ULCI monitoring occasions. In the example illustrated in FIG. 17, the BS configures the UE 115 with ULCI monitoring occasions 1710 and 1720 in a slot 1702a (e.g., slots 202 of FIG. 2). Each ULCI monitoring occasions 1710, 1720 may be associated with a respective timeline. For instance, the monitoring occasion 1710 may be associated with a time offset 1712 indicating when a cancellation for a ULCI detected in the monitoring occasion 1710 may begin, and the cancellation for the detected ULCI may be within a duration 1714. In some instances, the time offset 1712 may be denoted as $T_{proc,2}+d$ and the cancellation duration 1714 may be denoted as T_CI. Similarly, the monitoring occasion 1720 may be associated with a time offset 1722 indicating when a cancellation for a ULCI detected in the monitoring occasion 1720 may begin, and the cancellation for the detected ULCI may be within a duration 1724.

As an example, the BS 105 transmits a ULCI 1730 during the monitoring occasion 1720. The ULCI 1730 may be a DCI format 2_4 message. The ULCI 1730 may be similar to the DCI 1210 and/or 1610. The ULCI 1730 may indicate a cancellation for a resource 1704 within a previously configured or scheduled resource for a PUSCH transmission 1740 in a slot 1702b as shown by the arrow 1703. Accordingly, the UE 115 may transmit the PUSCH transmission 1740 (shown by the patterned filled box), and in response to the ULCI 1730, the UE 115 may refrain from transmitting the PUSCH transmission 1740 in the cancelled resource 1704 (as shown by the empty-filled box with a "X" mark). Although a last portion 1705 of the PUSCH resource is not cancelled by the ULCI 1730, the UE 115 may not resume the PUSCH transmission after the cancelled resource 1704 as shown by the emptied filled box.

Figure 18:
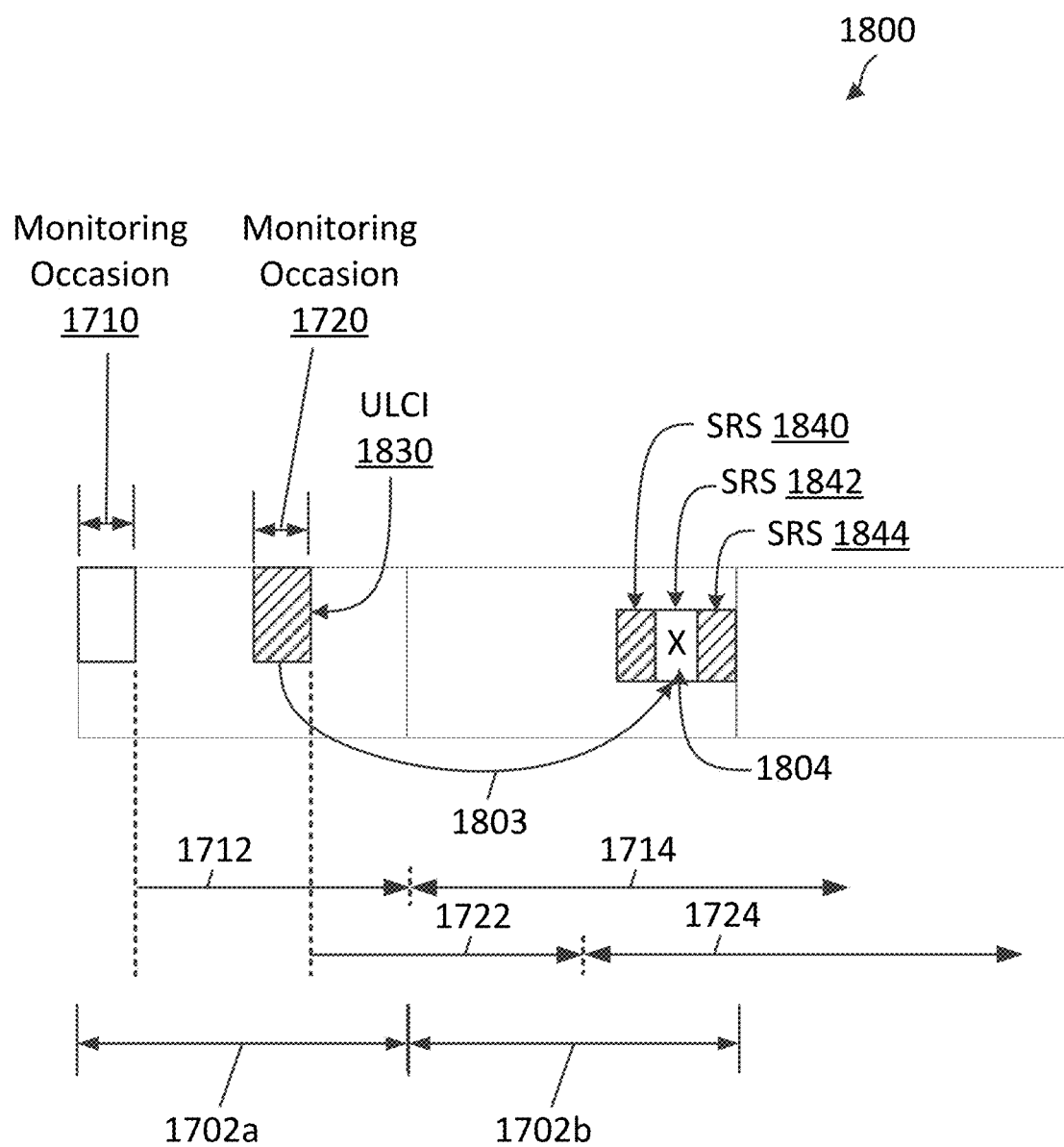
FIG. 18 illustrates a timeline for a resource cancellation scenario according to one or more aspects of the present disclosure.

FIG. 18 illustrates a timeline for a resource cancellation scenario 1800 according to one or more aspects of the present disclosure. The scenario 1800 may correspond to a resource cancellation scenario in the network 100. In the scenario 1800, a BS 105 may communicate a resource cancellation with a UE 115 using similar mechanisms as discussed above with respect to FIGS. 4-6, 7A-7B, 9-15. The scenario 1800 is discussed using the same ULCI monitoring occasion configuration as in the scenario 1700, and may use the same reference numerals for simplicity's sake. In the scenario 1800, the BS 105 transmits a ULCI 1830 during the monitoring occasion 1720. The ULCI 1830 may be a DCI format 2_4 message. The ULCI 1830 may be similar to the DCI 1210, 1610, and/or 1730. The ULCI 1830 may indicate a cancellation for a resource 1804 within a slot 1702b as shown by the arrow 1803. The BS 105 may have previously scheduled the UE 115 to transmit SRSs 1840, 1842, and 1844 in the slot 1702b, where the allocation for the resource 1804 to be cancelled may correspond to a resource allocated for the SRS 1842. Accordingly, the UE 115 may transmit the SRS 1840 (shown by the patterned filled box) as scheduled, refrain from transmitting the SRS 1842 in the cancelled resource 1804 (shown by the empty-filled box with a "X"

mark) in response to the ULCI 1830, and transmit the SRS 1844 as scheduled. Compared to FIG. 17, the UE 115 may transmit the SRS 1844 after the cancelled resource 1804 as the SRS 1844 is scheduled in a resource separate from the cancelled resource 1804. In other words, the UE 115 is not resuming a transmission, but transmitting a new SRS 1844 after the cancelled resource 1804.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving downlink control information (DCI) from a base station (BS), the DCI including an uplink (UL) cancellation indication that references a plurality of resources in one or more full-UL slots and one or more full-duplex slots;
   monitoring a set of monitoring occasions associated with the one or more full-duplex slots and the one or more full-UL slots for the DCI, the UL cancellation indication being associated with a set of parameters specifying a first number of symbols in the plurality of resources, wherein the first number of symbols is within the one or more full-duplex slots and the one or more full-UL slots; and
   refraining, based on the UL cancellation indication, from transmitting a communication in at least one of a first resource of the plurality of resources in the one or more full-UL slots or a second resource of the plurality of resources in the one or more full-duplex slots.

2. The method of claim 1 wherein the UL cancellation indication comprises a first bit sequence for the one or more full-UL slots and a second bit sequence for the one or more full-duplex slots.

3. The method of claim 2, further comprising:
   based on the first number of symbols being within the one or more full-duplex slots and the one or more full-UL slots:
   refraining from applying the first bit sequence to the one or more full-duplex slots; and
   refraining from applying the second bit sequence to the one or more full-UL slots.

4. The method of claim 1, wherein the set of parameters further specifies a second number of symbol groups, and wherein the method further comprises:
   refraining from applying the UL cancellation indication to a first symbol group including one or more symbols in the one or more in full-UL slots based on one or more symbol groups of the second number of symbol groups being within the one or more full-UL slots and the one or more full-duplex slots.

5. The method of claim 1, wherein the set of parameters further specifies a second number of symbol groups, and wherein the method further comprises:
   refraining from applying the UL cancellation indication to a first symbol group including one or more symbols in the one or more full-UL slots and the one or more full-duplex slots based on one or more symbol groups of the second number of symbol groups being within the one or more full-UL slots and the one or more full-duplex slots.

6. The method of claim 1, wherein the set of parameters further specifies a second number of symbol groups, and wherein the method further comprises:
   applying the UL cancellation indication to a symbol group including one or more symbols in the one or more full-UL slots and the one or more full-duplex slots in response to a determination that one or more symbol groups of the second number of symbol groups is within the one or more full-UL slots and the one or more full-duplex slots.

7. The method of claim 1, wherein the plurality of resources are associated with a first time-frequency grid, and wherein the method further comprises:
   truncating the first time-frequency grid to generate a second time-frequency grid; and
   applying the UL cancellation indication to a plurality of symbols associated with the second time-frequency grid.

8. An apparatus comprising:
   one or more memories;

one or more processors in communication with the one or more memories and configured to execute computer program instructions stored on the one or more memories, wherein the apparatus is configured to:

receive downlink control information (DCI) from a base station (BS), the DCI including an uplink (UL) cancellation indication that references a plurality of resources in one or more full-UL slots and one or more full-duplex slots;

monitor a set of monitoring occasions associated with the one or more full-duplex slots and the one or more full-UL slots for the DCI, the UL cancellation indication being associated with a set of parameters specifying a first number of symbols in the plurality of resources, wherein the first number of symbols is within the one or more full-duplex slots and the one or more full-UL slots; and refrain, based on the UL cancellation indication, from transmitting a communication in at least one of a first resource of the plurality of resources in the one or more full-UL slots or a second resource of the plurality of resources in the one or more full-duplex slots.

9. The apparatus of claim 8 wherein the UL cancellation indication comprises a first bit sequence for the one or more full-UL slots and a second bit sequence for the one or more full-duplex slots.

10. The apparatus of claim 9, wherein the apparatus is further configured to:

based on the first number of symbols being within the one or more full-duplex slots and the one or more full-UL slots:

refrain from applying the first bit sequence to the one or more full-duplex slots; and refrain from applying the second bit sequence to the one or more full-UL slots.

11. The apparatus of claim 8, wherein the set of parameters further specifies a second number of symbol groups, and wherein the apparatus is further configured to:

refrain from applying the UL cancellation indication to a first symbol group including one or more symbols in the one or more in full-UL slots based on one or more symbol groups of the second number of symbol groups being within the one or more full-UL slots and the one or more full-duplex slots.

12. The apparatus of claim 9, wherein the set of parameters further specifies a second number of symbol groups, and wherein the apparatus is further configured to:

refrain from applying the UL cancellation indication to a first symbol group including one or more symbols in the one or more full-UL slots and the one or more full-duplex slots based on one or more symbol groups of the second number of symbol groups being within the one or more full-UL slots and the one or more full-duplex slots.

13. The apparatus of claim 9, wherein the set of parameters further specifies a second number of symbol groups, and wherein the apparatus is further configured to:

apply the UL cancellation indication to a symbol group including one or more symbols in the one or more full-UL slots and the one or more full-duplex slots in response to a determination that one or more symbol groups of the second number of symbol groups is within the one or more full-UL slots and the one or more full-duplex slots.

14. The apparatus of claim 9, wherein the plurality of resources are associated with a first time-frequency grid, and wherein the apparatus is further configured to:

truncate the first time-frequency grid to generate a second time-frequency grid; and apply the UL cancellation indication to a plurality of symbols associated with the second time-frequency grid.

15. A user equipment (UE) comprising:

means for receiving downlink control information (DCI), the DCI including an uplink (UL) cancellation indication that references a plurality of resources in one or more full-UL slots and one or more full-duplex slots;

means for monitoring a set of monitoring occasions associated with the one or more full-duplex slots and the one or more full-UL slots for the DCI, the UL cancellation indication being associated with a set of parameters specifying a first number of symbols in the plurality of resources, wherein the first number of symbols is within the one or more full-duplex slots and the one or more full-UL slots; and means for refraining, based on the UL cancellation indication, from transmitting a communication in at least one of a first resource of the plurality of resources in the one or more full-UL slots or a second resource of the plurality of resources in the one or more full-duplex slots.

16. The UE of claim 15, wherein the UL cancellation indication comprises a first bit sequence for the one or more full-UL slots and a second bit sequence for the one or more full-duplex slots.

17. The UE of claim 16, further comprising:

based on the first number of symbols being within the one or more full-duplex slots and the one or more full-UL slots:

means for refraining from applying the first bit sequence to the one or more full-duplex slots; and means for refraining from applying the second bit sequence to the one or more full-UL slots.

18. The UE of claim 15, wherein the set of parameters further specifies a second number of symbol groups, and wherein the UE further comprises:

means for refraining from applying the UL cancellation indication to a first symbol group including one or more symbols in the one or more in full-UL slots based on one or more symbol groups of the second number of symbol groups being within the one or more full-UL slots and the one or more full-duplex slots.

19. The UE of claim 15, wherein the set of parameters further specifies a second number of symbol groups, and wherein the UE further comprises:

means for refraining from applying the UL cancellation indication to a first symbol group including one or more symbols in the one or more full-UL slots and the one or more full-duplex slots based on one or more symbol groups of the second number of symbol groups being within the one or more full-UL slots and the one or more full-duplex slots.

20. The UE of claim 15, wherein the set of parameters further specifies a second number of symbol groups, and wherein the UE further comprises:

means for applying the UL cancellation indication to a symbol group including one or more symbols in the one or more full-UL slots and the one or more full-duplex slots in response to a determination that one or more symbol groups of the second number of symbol groups is within the one or more full-UL slots and the one or more full-duplex slots.

* * * * *